US009894536B2

(12) United States Patent
Paulraj et al.

(10) Patent No.: US 9,894,536 B2
(45) Date of Patent: Feb. 13, 2018

(54) MOTION-CONTROLLED DEVICE FOR SUPPORTING PLANNING, DEPLOYMENT OR OPERATION OF A WIRELESS NETWORK

(71) Applicant: Aruba Networks, Inc., Sunnyvale, CA (US)

(72) Inventors: Arogyaswami Paulraj, Stanford, CA (US); Bernd Bandemer, Palo Alto, CA (US); Jose Tellado, Mountain View, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 126 days.

(21) Appl. No.: 14/827,282

(22) Filed: Aug. 15, 2015

(65) Prior Publication Data

US 2016/0269913 A1 Sep. 15, 2016

Related U.S. Application Data

(63) Continuation-in-part of application No. 14/720,755, filed on May 23, 2015, which is a continuation-in-part of application No. 14/643,332, filed on Mar. 10, 2015.

(51) Int. Cl.
*H04W 16/18* (2009.01)

(52) U.S. Cl.
CPC .................... *H04W 16/18* (2013.01)

(58) Field of Classification Search
CPC .. H04L 47/25; H04W 16/18; H04W 28/0268; H04W 84/12; G01S 7/003; G06F 21/35; G06Q 20/32
See application file for complete search history.

(56) References Cited

U.S. PATENT DOCUMENTS

| 7,177,311 | B1 | 2/2007 | Hussain et al. |
| 7,456,596 | B2 | 11/2008 | Goodall et al. |
| 7,460,837 | B2 | 12/2008 | Diener |
| 8,022,822 | B2 | 9/2011 | Liang et al. |
| 8,386,593 | B1 | 2/2013 | Gao et al. |

(Continued)

OTHER PUBLICATIONS

Tellado, J., et al.; "Non-Final Office Action U.S. Appl. No. 14/643,332"; dated Sep. 7, 2016; 16 pages.
Paulraj, A.; "Non-Final Office Action U.S. Appl. No. 14/720,755"; dated Oct. 20, 2016; 30 pages.

*Primary Examiner* — David Oveissi
(74) *Attorney, Agent, or Firm* — Brooks, Cameron & Huebsch, PLLC

(57) ABSTRACT

Systems, methods and apparatuses for a motion-controlled device that is operable to support deployment or operation of a wireless network, are disclosed. One apparatus (motion-controlled device) includes a receiver, a motion controller, and a controller. The receiver is operative to sense wireless communication signals of a wireless network. The motion controller is operative to control a positioning of the motion-controlled device in a plurality of dimensions. The controller is operative to at least facilitate analysis of the sensed wireless communication signals, and provide a control signal to the motion controller, wherein the control signal controls the positioning of the motion-controlled device based at least in part on the sensed wireless communication signals.

35 Claims, 24 Drawing Sheets

(56) References Cited

U.S. PATENT DOCUMENTS

| | | | |
|---|---|---|---|
| 9,203,563 B2 | 12/2015 | Etemad et al. | |
| 2005/0078968 A1 | 4/2005 | Ohta | |
| 2008/0086236 A1* | 4/2008 | Saito | G01S 5/0252 |
| | | | 700/245 |
| 2008/0151761 A1 | 6/2008 | Theisen et al. | |
| 2008/0151762 A1 | 6/2008 | Armstrong et al. | |
| 2008/0267145 A1 | 10/2008 | Vangati | |
| 2009/0097468 A1 | 4/2009 | Yi et al. | |
| 2009/0254216 A1* | 10/2009 | Matsushima | B25J 9/1671 |
| | | | 700/246 |
| 2009/0260083 A1 | 10/2009 | Szeto et al. | |
| 2009/0328219 A1 | 12/2009 | Narayanaswamy | |
| 2010/0030417 A1* | 2/2010 | Fang | G05D 1/0274 |
| | | | 701/25 |
| 2011/0188415 A1 | 8/2011 | Graziano | |
| 2011/0252079 A1 | 10/2011 | Werner et al. | |
| 2012/0250546 A1 | 10/2012 | Hamida et al. | |
| 2013/0084984 A1* | 4/2013 | Gagner | G07F 17/3206 |
| | | | 463/39 |
| 2013/0227689 A1 | 8/2013 | Pietrowicz | |
| 2013/0316738 A1 | 11/2013 | Noonan | |
| 2014/0159729 A1 | 6/2014 | Olsson et al. | |
| 2014/0253295 A1* | 9/2014 | Roberts | H04M 1/7253 |
| | | | 340/10.5 |
| 2015/0015895 A1 | 1/2015 | Bridges et al. | |
| 2015/0032258 A1 | 1/2015 | Passot et al. | |
| 2015/0094852 A1 | 4/2015 | Laurent et al. | |
| 2016/0037559 A1 | 2/2016 | Malik et al. | |

\* cited by examiner

Obtaining, by a network service engine, a plurality of link quality signatures, wherein each of the plurality of link quality signatures includes link qualities between a network node and a plurality of network sensors

2310

Estimating, by the network service engine, link qualities between a plurality of network nodes based on the plurality of link quality signatures and a network estimation model.

MOTION-CONTROLLED DEVICE FOR SUPPORTING PLANNING, DEPLOYMENT OR OPERATION OF A WIRELESS NETWORK

RELATED APPLICATIONS

This patent application is a continuation-in-part (CIP) of U.S. patent application Ser. No. 14/720,755, filed May 23, 2015, which is continuation-in-part (CIP) of U.S. patent application Ser. No. 14/643,332, filed Mar. 10, 2015, which are herein incorporated by reference.

FIELD OF THE DESCRIBED EMBODIMENTS

The described embodiments relate generally to wireless communications. More particularly, the described embodiments relate to systems, methods and apparatuses for a motion-controlled device that supports planning, deployment or operation of a wireless network.

BACKGROUND

Wireless networks are being widely deployed due to the convenience of tether-less communications. The wireless networks are operable to support fixed or mobile/nomadic applications. The wireless network can be deployed indoors and outdoors. Further, such wireless networks can range from optical or near optical spectrum bands to radio frequencies from terahertz to megahertz bands.

Wireless networks have been witnessing increasing capacity/data rates, coverage and seamless connectivity. Wireless networks span wide area including satellite networks to wide area mobile networks to local area WiFi (Wireless Fidelity) to restricted (room) or personal area networks. These WiFi networks offer a low cost way of achieving high data throughput rates. Some of these networks, such as cellular, use licensed frequency bands, while others operate in unlicensed bands. More recently, more complex ways of band sharing have also been introduced. Due to the nature of wireless propagation and the complex protocols used in transmission and access, wireless networks often show a range of problems from simple inability to connect to the network to poor throughput performance.

Such problems are particularly evident in Wi-Fi networks that use Carrier Sense, Multiple Access with Collision avoidance (CSMA/CA) mechanisms to regulate transmissions. Briefly, each wireless network end device detects if the medium is being used; if so, the end device waits a random amount of time before trying to transmit again. This method of contending for the medium is simple, intrinsically fair, and requires no central scheduling. However, in the case of densely deployed Wi-Fi networks, this method of communication has a number of shortcomings, which include co-located Wi-Fi devices contending for the medium back-off to one another, leading to wasted time when the channel is idle. Further, co-located Wi-Fi devices that pick the same back-off time cause packets to collide over-the-air, leading to packet loss and reduced throughput. Further, end device vendors implement proprietary algorithms (e.g., for roaming) that lead to sub-optimal network performance. Further, end devices expose limited control (e.g., to schedule transmissions) for the network to optimize their performance. Further, legacy (802.11a/b/g) end devices reduce overall network throughput because they use much lower speeds and hence occupy the medium for longer time periods. Further, since WiFi uses unlicensed bands shared by other non-WiFi devices which do not follow WiFi protocols, they can cause increased contention and packet loss in Wi-Fi networks. A number of anomalies can result in wireless networks that can be hard to detect, difficult diagnose and complex to fix. Such anomalies can range for inability to connect or reconnect, poor or intermittent throughput, which we describe as poor user experience. Poor user experience increases operations cost, poor customer or user satisfaction. Other types of wireless networks, for example, cellular networks, Zigbee networks, Bluetooth networks, infrared networks, optical communication networks, etc., are also prone to connectivity and performance failures including total breakdown (non-operation) of a network node.

Further, the location and other installation related parameters of the fixed network nodes (or at least of the antenna) such as access points and base stations need to be chosen carefully so as to maximize coverage and throughput performance of the network. This often requires in-situ measurements of radio link parameters to ascertain which installation parameter choices maximizes network performance. Since such nodes (antennas) are often located outdoors on towers, roof tops or indoors near roof ceilings, these locations are hard or hazardous to access for human operators.

It is desirable to have systems, methods and apparatuses for supporting planning, deployment or operation of a wireless network.

SUMMARY

An embodiment includes a motion-controlled device. The motion-controlled device includes a receiver, a motion controller, and a controller. The receiver is operative to sense wireless communication signals of a wireless network. The motion controller is operative to control a positioning of the motion-controlled device in a plurality of dimensions. The controller is operative to at least facilitate analysis of the sensed wireless communication signals, and provide a control signal to the motion controller, wherein the control signal controls the positioning of the motion-controlled device based at least in part on the sensed wireless communication signals.

Another embodiment includes a wireless network. The wireless network includes a plurality of wireless devices, and one or more motion-controlled devices. Each motion-controlled wireless device includes a receiver, a motion controller, and a controller. The receiver is operative to sense wireless communication signals of at least one of the plurality of wireless devices of the wireless network. The motion controller (actuator) is operative to control a positioning of the motion-controlled device in a plurality of dimensions. The controller is operative to at least facilitate analysis of the sensed wireless communication signals, and provide a control signal to the motion controller, wherein the control signal controls the positioning of the motion-controlled device based at least in part on the sensed wireless communication signals.

Another embodiment includes a method of characterizing a wireless network. The method includes sensing, by a receiver of a motion-controlled device, wireless communication signals of a wireless network, controlling, by a motion controller, a positioning of the motion-controlled device in a plurality of dimensions, analyzing the sensed wireless communication signals, and providing a control signal to the motion controller, wherein the control signal controls the positioning of the motion-controlled device based at least in part on the sensed wireless communication signals.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 23 is a flow chart that includes steps of a method of estimating quality of wireless links between different wireless end devices, according to an embodiment.

DETAILED DESCRIPTION

The disclosed embodiments include a motion-controlled device (such as, a robot or a drone) that is operable to sense signals of a wireless network at multiple positionings of the motion-controlled device. At one or more of the positionings, the motion-controlled device is operable to receive wireless signals of the wireless network and support deployment or operation of the wireless network. For at least some embodiments, the sensed wireless signals provide at least a portion of the motion control of the motion-controlled device. For at least some embodiments, the motion-controlled device is activated on demand when a problem in the wireless network occurs, and senses information that is relevant to the problem.

For at least some embodiments, the motion-controlled device is operable to characterize an service area for pre-deployment analysis/planning of the wireless network. For at least some embodiments, the motion-controlled device is operable to determine how wireless signals propagate between a plurality of candidate locations for transceivers of the wireless network. For at least some embodiments, the motion-controlled device is operable to use optical sensors to determine whether a line-of-sight wireless connection is feasible between candidate locations for transceivers of the wireless network.

For at least some embodiments, the motion-controlled device is operable to characterize a deployed wireless network, and further operable to aid in diagnosing operation and/or performance of the deployed wireless network. For at least some embodiments, the motion-controlled device is operable to characterize a deployed wireless network, and further operable to aid in repairing, fixing and/or improving operation of the deployed wireless network. For at least some embodiments, the motion-controlled device is operable to monitor the wireless network continuously to detect performance and/or connectivity problems. For at least some embodiments, the motion-controlled device is operable to detect precursors of problems in the wireless network. That is, the motion-controlled device is operable to detect early warning signs of potential future problems.

Figure 1:
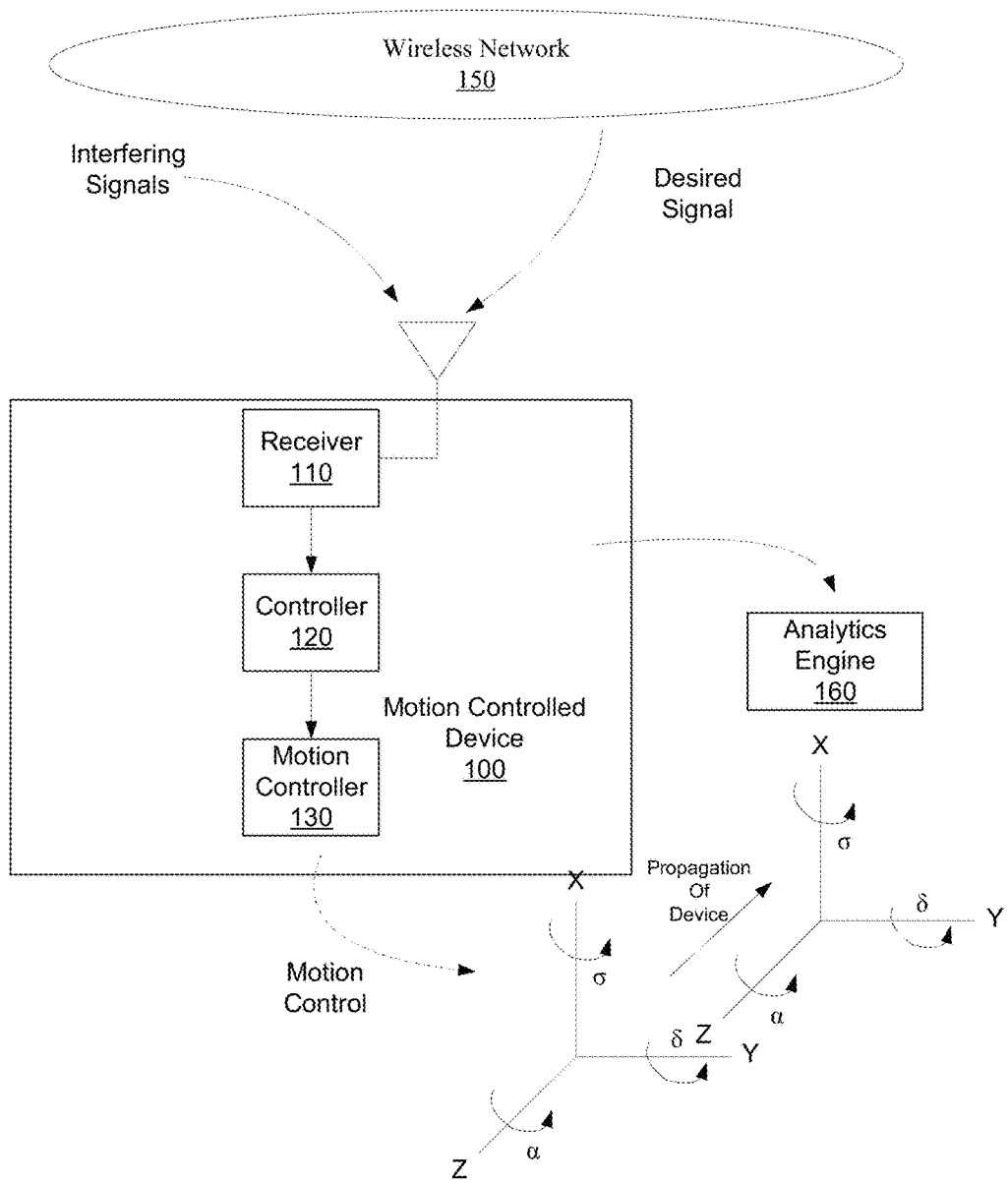
FIG. 1 shows a block diagram of a motion-controlled device that supports deployment and operation of a wireless network, according to an embodiment.

FIG. 1 shows a block diagram of a motion-controlled device that supports deployment and operation of a wireless network, according to an embodiment. The motion-controlled device 100 includes a receiver 110 operative to sense wireless communication signals of the wireless network 150 (which can be considered a target network). While depicted as a receiver 110, it is to be understood that the receiver 110 could be a part of a transceiver of the motion-controlled device 100. A motion controller 130 is operative to control a positioning of the motion-controlled device 100 in a plurality of dimensions. For an embodiment, the motion controller 130 includes a motion actuator. A controller 120 of the motion-controlled device 100 is operative to at least facilitate analysis of the sensed wireless communication signals (from the target network 150), and provide a control signal to the motion controller 120, wherein the control signal at least partially controls the positioning of the motion-controlled device 100 based on the sensed wireless communication signals.

As stated, the motion controller 130 controls positioning of the motion-controlled device 100. For at least some embodiments, the position control includes control of the location of the motion-controlled device 100. For example, the motion controller 120 can enable the motion-controlled device 100 to travel to multiple locations for receiving signals from or communicating with the wireless network 150, or communicating with other similar devices, for supporting deployment or operation of the wireless network 150. For at least some embodiments, the positioning control includes control of the orientation of the motion-controlled device 100. For example, the motion controller 120 can enable the motion-controlled device 100 to translationally and/or rotationally adjust the orientation of the motion-controlled device 100 to allow the motion-controlled device 100 to inspect and/or characterize features of the wireless network 150. For at least some embodiments, the position control includes control of the location and the orientation of the motion-controlled device 100. For at least some embodiments, the position control further includes control of positioning of a component of the motion-controlled device 100, for example an antenna or other sensors. The xyz axis of FIG. 1 shows possible adjustments in the positionings of the motion-controlled devices. That is, the positioning (which could include position or orientation of the device) can be adjusted in the x,y and z orientations, and rotated about any axis. Additionally, the x, y, z reference coordinates can change position over time. Further, a sensor or receiver of the motion-controlled device can be controlled in all of these positionings as well.

At least some embodiments of the motion controller 130 include mechanical means for controlling the positioning of the motion-controlled device 100. Many different implementations of the motion controller 130 are possible. For an embodiment, the motion controller 130 is implemented as a robot or drone that includes, for example, airborne vehicles such as helicopter, a multi-copter, a fixed-wing aircraft, or a ground-based wheeled vehicle, such as tracked or wheeled robots as well as wall or tower climbing vehicles and also water based vehicles that may operate on surface or below water.

FIG. 1 additionally includes an analytics engine 160. For an embodiment, the analytics engine 160 is included and operable within the motion-controlled device 100. For an embodiment, the analytics engine 160 is at least partially included within a server external to the motion-controlled device 100. If external, for an embodiment, at least a portion of information of the sensed communication signals is shared by the motion-controlled device 100 with the external server. That is, for an embodiment, the controller 120 is further operative to support communication with the analytics engine 160. For some embodiments, the communications link between the motion-controlled device 100 and analytics engine 160 is a separate communications link than the link supported by receiver 110 (or the transceiver 210 of FIG. 2). For some embodiments the separate communications link includes a wireless link, a wired link, and optical fiber link.

As will be described, at least some embodiments include a control loop in which the sensed communication signals are processed and used to control operation of at least some wireless devices associated with the wireless network 150. For at least some embodiments, the control loop includes the motion-controlled device 100 and/or the analytics engine 950.

As described, the controller 120 of the motion-controlled device 100 is operative to at least facilitate analysis of the sensed wireless communication signals, and provide a control signal to the motion controller 120, wherein the control signal at least partially controls the positioning of the motion-controlled device 950 based on the sensed wireless communication signals.

For at least some embodiments, the controller 120 being operative to provide the control signal to the motion controller includes the controller determining a received signal quality parameter at the receiver 110 of a signal received from at least one terminal of the wireless network 150, and selecting the control signal to the motion controller 130 to reposition the motion-controlled device 100 to change the received signal quality parameter of the signal received from the at least one terminal of the wireless network 150. For at least some embodiments, control signal to the motion controller 130 is selected to reposition the motion-controlled device 100 to change (for an embodiment, the change increases) the received signal quality parameter of the signal received from the at least one of terminals of the wireless network 150, while maintaining a received signal quality parameter of at least one signal received from other terminals of the wireless network relative (either above or below) to a specified threshold. For an embodiment, the motion-controlled device 100 is repositioned to maximize (increase) the received signal strength of the signal (a desired signal) from one terminal of the wireless network, while ensuring that the received signal strength of the signal from another terminal (a second desired signal) remains above a specified threshold. For another embodiment, the motion-controlled device 100 is repositioned to maximize (increase) the received signal strength of the signal (a desired signal) from one terminal of the wireless network, while ensuring that the received signal strength of the signal from another terminal (an undesired interfering signal) remains below a specified threshold. For another embodiment, the motion-controlled device 100 is operative to move along the signal power gradient of a wireless signal that interferes with the wireless network, thus locating the signal source.

The motion control can be influenced by the motion-controlled device 100 a software agent operating on the motion-controlled device 100, the analytics engine 160, and/or an operator. That is, for an embodiment, motion control of the motion-controlled device 100 is at least partially controlled by the analytics engine 160. For an embodiment, motion control of the motion-controlled device 100 is at least partially controlled by an operator. For an embodiment, the operator is located in network operator control (NOC). For an embodiment, a fleet of drones is ready to be dispatched at NOC. For an embodiment, the operator is located in a vehicle, such as a van, wherein the drone is launched from the van. For an embodiment, the operator uses visual control/oversight of partially autonomous drone operation.

The sensing of the wireless signals can be influenced by the motion-controlled device 100, a software agent operating on the motion-controlled device 100, the analytics engine 160, and/or an operator. That is, for an embodiment, sensing of the wireless signals is at least partially controlled by the analytics engine. For an embodiment, sensing of the wireless signals is at least partially controlled by an operator. For an embodiment, the motion-controlled device 100 has two sensing modes: In a first mode, sensing of the wireless signals is used for maneuvering the device to a desired position with respect to the transceivers (wireless devices) of the wireless network, and comprises measuring received signal strengths. In a second mode, sensing of the wireless signals is used for diagnosing a problem in the wireless network, and comprises measuring received signal strengths, signal source identifiers, wireless protocol sequence information, wireless protocol traffic patterns. In an embodiment, the motion-controlled device switches between the two sensing modes repeatedly at the direction of the analytics engine 160. For another embodiment, the two modes of sensing are carried out simultaneously (hybrid mode).

For an embodiment, the motion-controlled device 100 is equipped with additional sensors that are activated based on previously sensed wireless signals.

For an embodiment, the sensed wireless signals include signals transmitted from a first external transceiver to a second external transceiver, wherein the analysis of the sensed wireless communication signals comprises diagnosing a problem condition associated with signals transmitted from the first external transceiver to the second external transceiver. For example, for an embodiment, the motion-controlled device determines whether the received signal strength of the signals from the first external transceiver at the location of the second external transceiver exceeds a predetermined threshold. For another embodiment, the motion-controlled device determines an estimate of the number of distinct propagation paths of the signal transmitted from a first external transceiver to a second external transceiver. For another embodiment, the motion-controlled device determines a probability, over a predetermined period of time, of the signals transmitted from the first external transceiver to the second external transceiver being impaired by external interference.

As described, for at least some embodiments, the sensed signals are communication signals of the wireless network. Further, for at least some embodiments, the sensed wireless signals include signals interfering with communication within the wireless network.

For at least some embodiments, the motion-controlled device 100 is operative to modify or update a condition of a wireless device of the wireless network. For an embodiment, the update to the condition of the wireless device includes upgrading firmware of the wireless device. For an embodiment, the update to the condition of the wireless device includes reconfiguring, including for example, connecting the wireless device to a new/different access point. For an embodiment, the update to the condition of the wireless device includes replacing at least a portion of hardware of the wireless device. For an embodiment, the update to the condition of the wireless device includes repointing or redirecting an orientation of the wireless device or an antenna of the wireless device. For an embodiment, the wireless device includes a magnetic switch, and the update to the condition of the wireless device includes turning the wireless device on or off which reboots the wireless device. As will be described, for an embodiment, the motion-controlled device 100 physically interfaces through, for example, a docking mechanism, and the updates can be performed while the motion-controlled device 100 is docked to the wireless device.

For at least some embodiments, the sensed wireless signals include signals transmitted from a first external transceiver to a second external transceiver of the wireless network. That is, the motion-controlled device eavesdrops or listens (receives) wireless communication occurring within the wireless network. Further, the analysis of the sensed wireless communication signals includes diagnosing a problem condition associated with signals transmitted from the first external transceiver to the second external transceiver.

For at least some embodiments, the motion-controlled device is operative as a relay station within the wireless network. That is, the motion-controlled device itself becomes a part of the wireless network and aid at least one device of the wireless network to maintain a connection with the wireless network.

Figure 2:
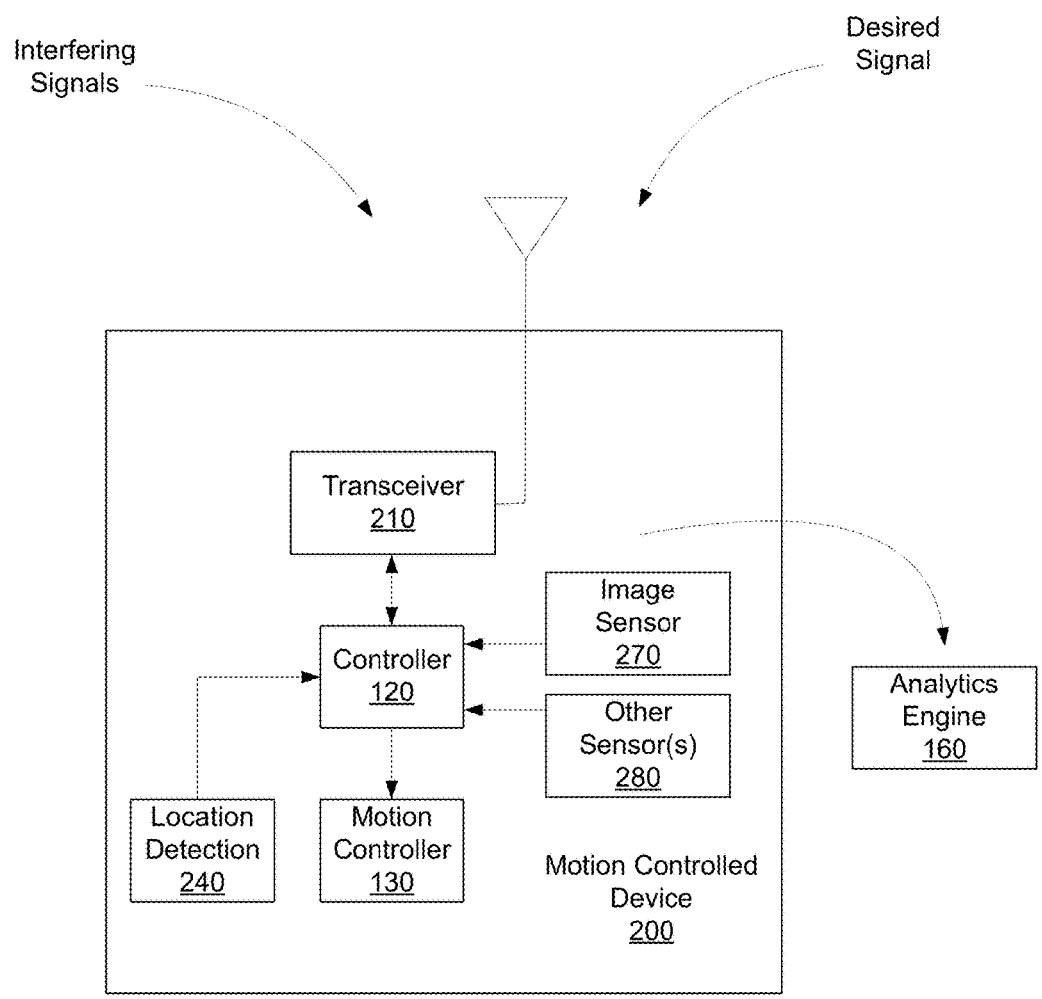
FIG. 2 shows another block diagram of a motion-controlled device that supports deployment and operation of a wireless network, according to another embodiment.

FIG. 2 shows another block diagram of a motion-controlled device 200 that supports deployment and operation of a wireless network, according to another embodiment. For this embodiment, the receiver in included within a transceiver 210. For an embodiment, the transceiver 210 allows the motion-controlled device 200 to communication with wireless devices of, for example, the wireless network 150.

For at least some embodiments, the communication with the wireless device of the wireless network is through a secondary communication channel of the wireless device. For example, the primary mode of communication within the wireless network could be an 802.11 wireless communication, whereas the communication between the motion-controlled device 200 and the wireless device could include cellular, Bluetooth and/or wired communication. For an embodiment, the motion-controlled device uses the secondary communication channel for its communication with the wireless device for purposes of robustness to failure of the primary mode of communication. For example, for an embodiment, the motion-controlled device determines that the primary communication channel is inoperative, and then falls back on the secondary communication channel. For another embodiment, the secondary communication channel exists for the purposes of secure communication with well-defined access control. For example, for an embodiment, the motion-controlled device determines that the first communication channel is not sufficiently secure for a particular type of information to be communicated, for example, a firmware upgrade, configuration update, etc., and then uses the secondary communication channel for this secure communication.

For another embodiment, the motion-controlled device is operable to control its positioning to maintain a distance from the wireless device that is below a predefined threshold (that is, the motion controller maintains the distance between the motion-controlled device and the wireless device to be within a threshold distance). Example secondary communication channels include near-field communication, short-distance networks, personal area networks (PAN). For example, this positioning control is implemented for the purpose of security by proximity. For another example, this positioning control is implemented for the purpose of maintaining a data transmission rate above a certain threshold via the primary or secondary communication channel. Maintenance of the distance to within the threshold distance allows for the primary or secondary channel to be established and maintained, enhances the security of the communication, and allows for a transmission data rate of communication through the primary or secondary communication channel to be greater than a threshold.

For at least some embodiments, the communication with the wireless device of the wireless network includes the motion-controlled device receiving internal state information of the wireless device. For at least some embodiments, the internal state information includes one or more of transmitted packet count, received packet count, packet failure count, packet count per modulation and coding scheme (MCS), received signal strength, history of received signal strength, rate control state, protocol state, traffic profile information, history of traffic information, interfering signal state, event logs, environmental sensor state, operating system state, file system state, firmware state, and/or hardware state.

Further, the motion-controlled device 200 includes an image sensor 270 and/or other sensors 280. An exemplary non-complete list of possible sensors includes camera, a light sensor, power detector, thermal imaging/heat sensor, humidity sensor, and/or an image sensor.

For an embodiment, the sensor includes an image sensor 270, and the controller 120 is further operative to facilitate analysis of a wireless device of the wireless network based on at least one image generated by the image sensor. For example, for an embodiment, the at least one image is utilized to detect miss-pointing of an antenna of the wireless device, detect physical antenna damage.

Further, the controller 120 is operative to determine from at least one image generated by the image sensor an approximation of a quantity related to the wireless network, determine, based on the approximation of the quantity, whether to conduct a direct measurement of the quantity related to the wireless network, perform the direct measurement of the quantity related to the wireless network, and select the control signal to the motion controller to reposition the motion-controlled device to change the quantity towards a pre-specified target value.

For at least some embodiments, the approximation of the quantity related to the wireless network includes at least one of estimates of angles, distances, obstruction, line of sight, etc. For at least some embodiments, the direct measurement of the quantity related to the wireless network includes at least one of signal strength, interference level, connectivity matrix, etc. The direct measurement of the quantity may take long (for example, 2 seconds). Using the image sensor allows a targeting of the measure only at positions that are promising.

Further, as shown in FIG. 2, the motion-controlled device 200 includes location detection 240. The location detection unit 240 allows for a determination of one or more locations of the motion-controlled device. For an embodiment, the sensed wireless communication signals of the wireless network are monitored or tracked along with the determined locations. For an embodiment, the location detection unit 240 includes at least one of a GPS receiver, a WiFi signature analysis, an accelerometer, a gyroscope a, magnetic sensor, other GPS-like triangulation systems etc.

Figure 3:
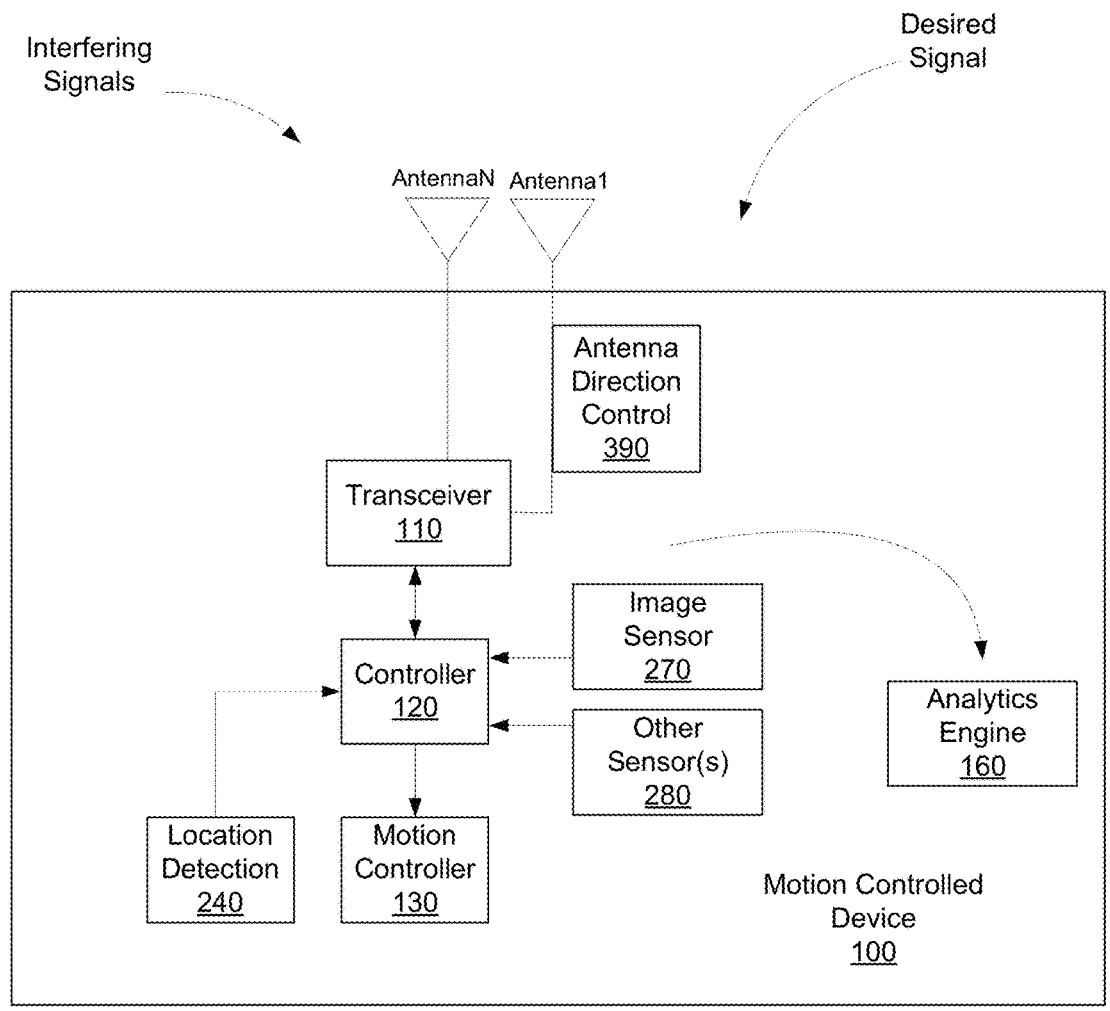
FIG. 3 shows another block diagram of a motion-controlled device that supports deployment and operation of a wireless network, according to another embodiment.

FIG. 3 shows another block diagram of a motion-controlled device that supports deployment and operation of a wireless network, according to another embodiment. This embodiment includes at least one of a directional antenna (antenna1) wherein an actuator (antenna direction control 390) controls the direction of the directional antenna, or multiple antennas (antenna1-antennaN).

For an embodiment, the actuator 390 of the directional antenna is operable to control the directional antenna in as many as three dimensions. For an embodiment, the actuator 390 of the directional antenna includes motors that move the directional antenna to point in a predetermined direction.

For another embodiment, the actuator 390 of the directional antenna is operable to vary the directional gain of the antenna. For another embodiment, the actuator 390 of the directional antenna is operable to ensure the directional antenna remains pointed at a predetermined target regardless of the positioning of the motion-controlled device 100.

It is to be understood that for at least some embodiments, the actuator control can extend to other sensors of the motion-controlled device, such as image sensor 270 or other sensors 280. For an embodiment, the actuator control of the image sensor 270 can implement panoramic image acquisition. For another embodiment, multiple images taken from different image sensor positionings enable faster detection of problems in the wireless network.

As previously stated, for an embodiment, the motion-controlled device is operative to communicate with a wireless device of the wireless network. For an embodiment, based on directional pointing of the one or more antennas, the motion-controlled device is operative to determine desirable placements of to-be-deployed wireless devices of the wireless network. For an embodiment, the directional antenna includes the same design as the antenna in the to-be-deployed wireless device. For another embodiment, the directional antenna of the motion-controlled device 100 is an adaptive antenna that can be configured to behave as either one of a plurality of possible antenna designs in the to-be-deployed wireless device. In this embodiment, sensing results from the motion-controlled device 100 help in choosing one of the plurality of possible antenna designs. For another embodiment, the motion-controlled device 100 records data that helps select among a plurality of different to-be-deployed wireless device designs.

For an embodiment, the motion-controlled device is operative to indicate desirable placement of the to-be-deployed wireless device by physically marking the position. For example, a roof-top may be marked to indicate a desired placement of an access point, or an antenna of a receiving device. This can include, for example, marking chalk on a roof tile, or marking a location with (washable) ink or chalk spray.

Figure 4:
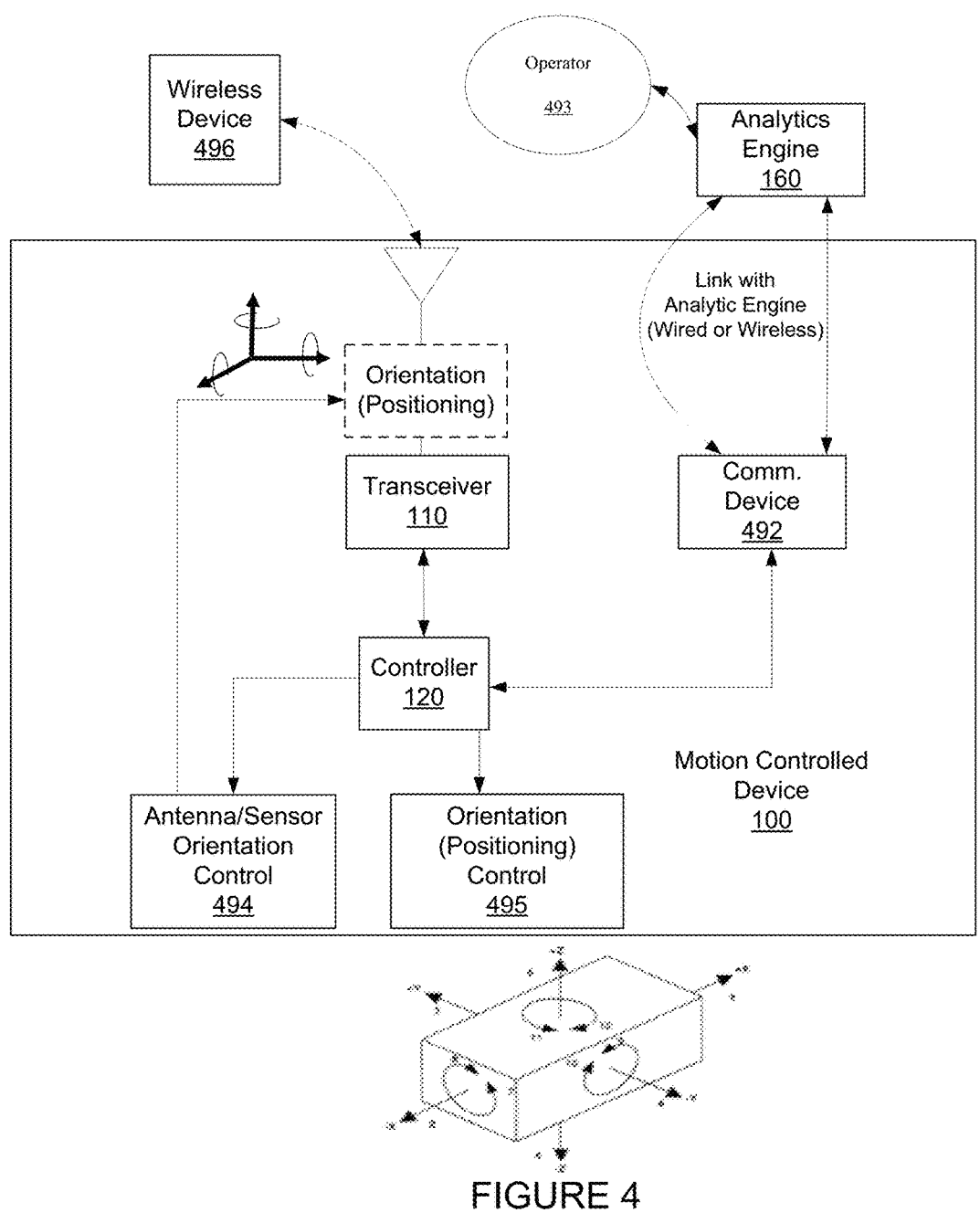
FIG. 4 shows another block diagram of a motion-controlled device that supports deployment and operation of a wireless network, according to another embodiment.

FIG. 4 shows another block diagram of a motion-controlled device 100 that supports deployment and operation of a wireless network, according to another embodiment. As previously described, this embodiment includes the orientation (positioning) control 495 that controls a positioning of the motion-controlled device 100. As previously described, this embodiment includes the orientation (positioning) control 494 that controls a positioning of the antenna of the motion-controlled device 100.

The embodiment of FIG. 4 further includes a communication device 492 that supports a separate communication channel with the analytics engine 160, or at least a portion of the analytics engine 160. That is, separate from the communication channel between the motion-controlled device and the wireless device 496 of the wireless network. As such, for an embodiment, the motion-controlled device 100 is operable to support a first communications channel with the wireless device 496, and a second communications channel with at least a portion of the analytics engine 160. Further, for an embodiment, an operator 493 interfaces with the analytics 160.

Figure 5:
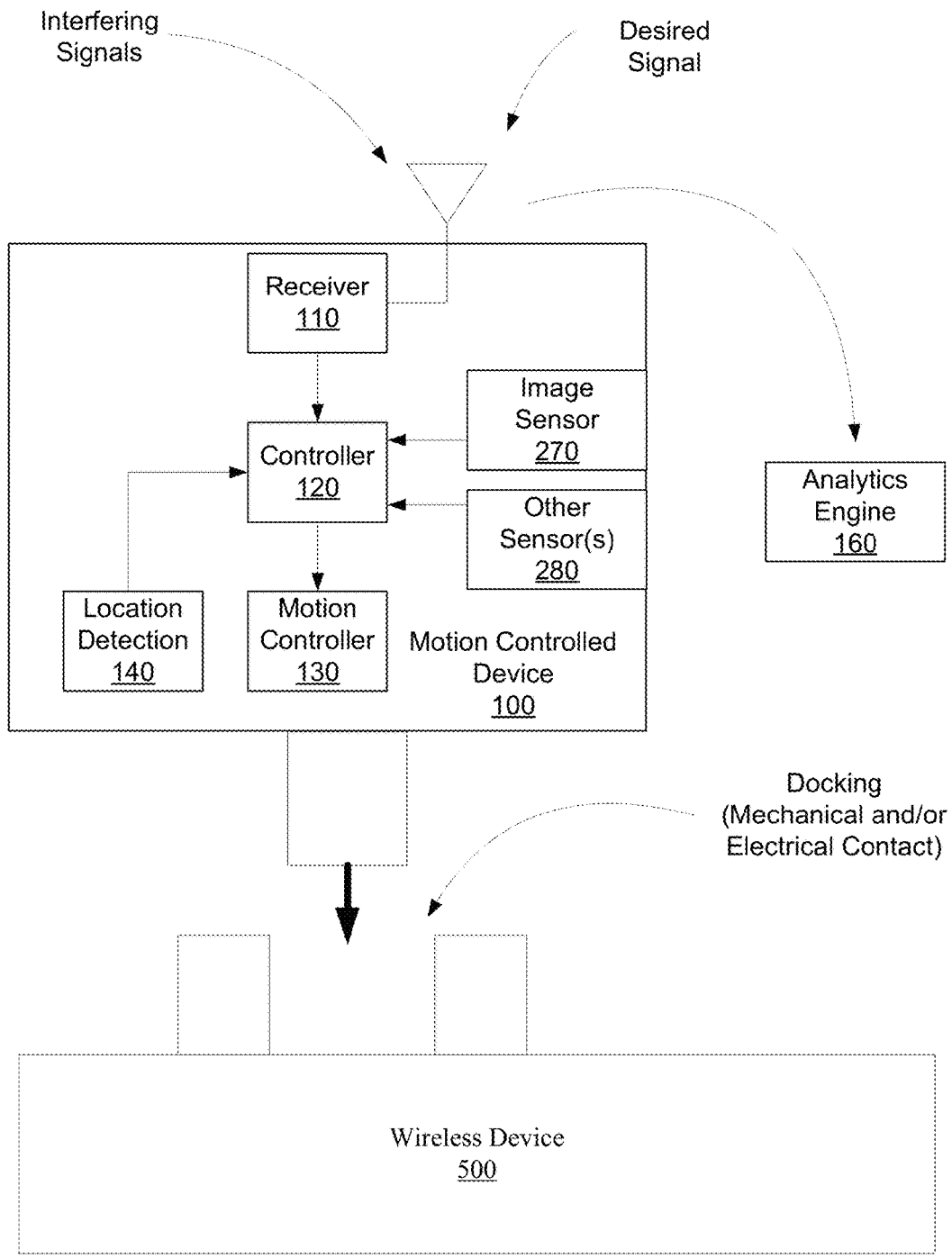
FIG. 5 shows a block diagram of a motion-controlled device that supports deployment and operation of a wireless network that includes a docking mechanism, according to an embodiment.

FIG. 5 shows a block diagram of a motion-controlled device 100 that supports deployment and operation of a wireless network that includes a docking mechanism, according to an embodiment. For an embodiment, the controller 120 and the motion controller 130 are further operative to dock the motion-controlled device 100 with a wireless device 500 of the wireless network 150. Once physically docked with the wireless device 500, the motion-controlled device 100 can extract at least some information from the wireless device 500, or provide at least some information (which is secure) to the wireless device 500. For an embodiment, once docked, the motion-controlled device 100 is operative to provide temporary replacement service (for example, drone stays in place until technician arrives). For an embodiment, once docked, the motion-controlled device 100 is operative to mechanically replace at least a part of the wireless device 500.

For an embodiment, once docked, at least some information is communicated between the motion-controlled device and the wireless device through a mechanical/electrical connection that is established while the motion-controlled device is docked with the wireless device.

Figure 6:
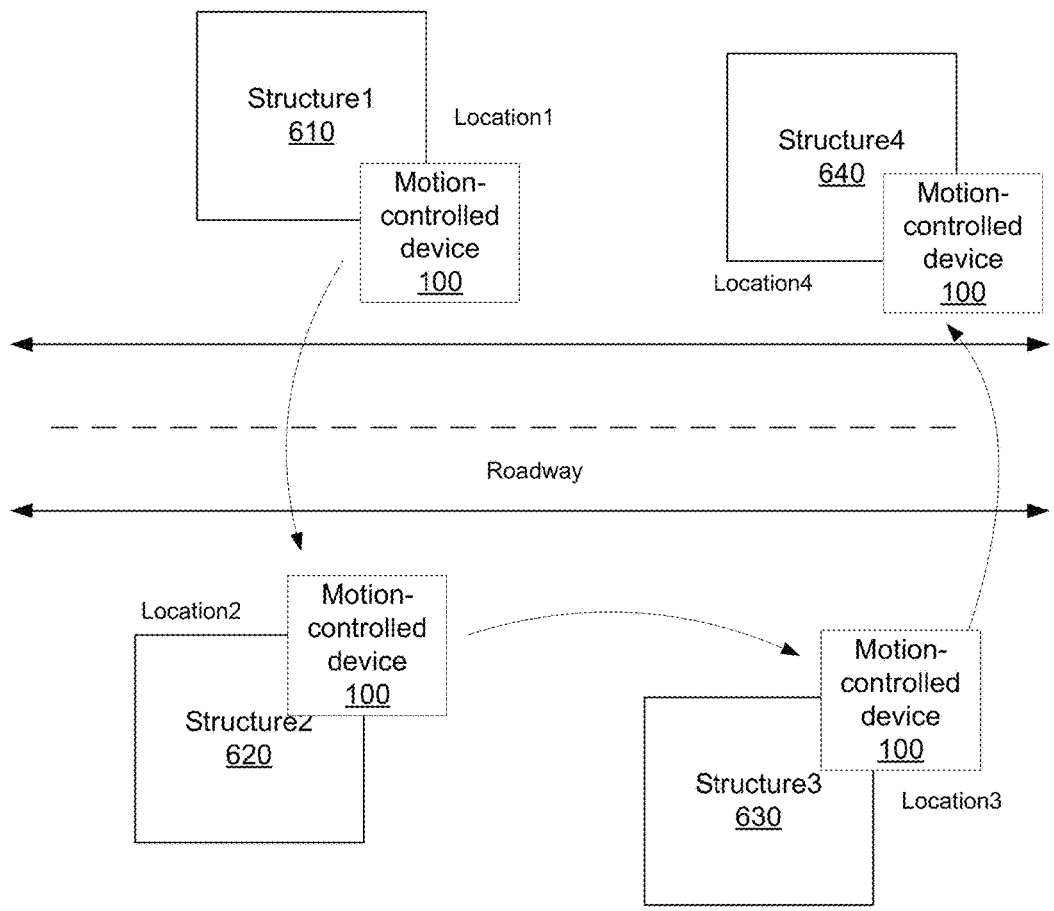
FIG. 6 shows a device at a sequence of locations of a wireless network, according to an embodiment.

FIG. 6 shows a motion controlled device 100 at a sequence of locations of a wireless network, according to an embodiment. The sequence of locations can include, for example, visits to a first structure 610, a second structure 620, a third structure 630, and a fourth structure 640. As previously described, for an embodiment, a location detection unit (such as location determination unit 140) is operative to determine one or more physical locations of the motion-controlled device 100. Further, for an embodiment, the motion-controlled device 100 is operative to visit multiple locations, determine a physical location of the motion-controlled device 100 at each of the multiple locations, and measure a quantity of interest at each of the multiple locations and/or positionings of the motion-controlled device 100.

For an embodiment, at least one of the motion-controlled device 100 or the analytics engine 160 records the locations/measured quantities of interest. For an embodiment, the motion-controlled device 100 is operative to communicate the measured quantities of interest and corresponding locations to an analytics engine. For an embodiment, the measured quantities of interest include at least one of signal strength, wireless capacity, MIMO channel characteristics, and/or interference levels.

For at least some embodiments, the analytic engine 160 generates a map of the quantity of interest. For an embodiment, the map is a 2D (two-dimension) map that includes values of the quantity of interest at, for example, longitude (x), latitude (y). For an embodiment, the map is a 3D map that includes values of the quantity of interest at, for example, longitude (x), latitude (y) and elevation (z). For an embodiment, the map is greater than a 3D map and further includes an orientation of the motion-controlled device or an orientation of an antenna or sensor of the motion-controlled device. For an embodiment, the map is greater than a 6D map that further includes an orientation of the motion-controlled device and an orientation of an antenna or sensor of the motion-controlled device.

To optimize the travel of the motion-controlled device to any particular location of the wireless network, for an embodiment, the motion-controlled device is one of a plurality of devices, wherein each device of the plurality of devices is physically stored at an optimized location when inactive, wherein each point in the wireless network can be navigated to within a predetermined time by at least one of the plurality of devices.

Further, for an embodiment, the motion-controlled device is operative to follow a predefined measurement schedule when a problem of the wireless network is detected.

Further, for an embodiment, the motion-controlled device is operative to determine desirable placements of to-be-deployed wireless devices of the wireless network.

Figure 7:
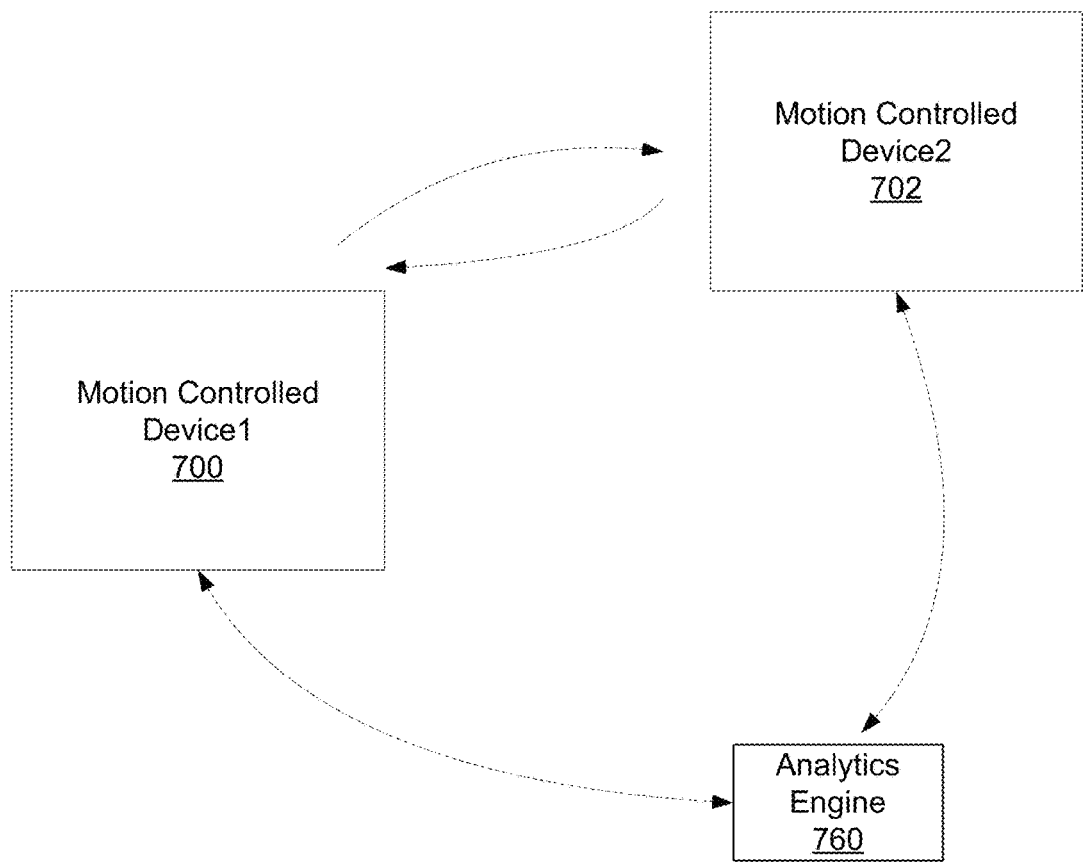
FIG. 7 shows a multiple motion-controlled devices that support deployment and operation of a wireless network, according to an embodiment.

FIG. 7 shows a multiple motion-controlled devices 700, 702 that support deployment and operation of a wireless network, according to an embodiment. For an embodiment, the multiple motion-controlled devices 700, 702 are used in conjunction to characterize the wireless network.

For an embodiment, motion between the motion-controlled devices 700, 702 is coordinated by an analytics engine that is communicating with each of the plurality of devices.

For an embodiment, at least some of the motion-controlled devices of the plurality of devices sensing wireless signals at overlapping time intervals. For another embodiment, a subset of motion-controlled devices of the plurality of devices are sensing wireless signals, while the remainder of the plurality is deployed as wireless network nodes in a predetermined fashion to generate a specific wireless network scenario of interest. For example, at least one motion-controlled device of the plurality of devices is configured as a network access point, while a second motion-controlled device of the plurality of devices senses the access point signal strength at various locations. If more than one motion-controlled device of the plurality of devices is configured as a network access point, this enables determining frequency reuse patterns and capacity coverage.

For another embodiment, two motion-controlled devices of the plurality of motion-controlled devices act as wireless communication partners, while a third motion-controlled device of the plurality of devices transmits a predetermined interference signal from predetermined locations.

For an embodiment, the plurality of motion-controlled devices is coordinated by the analytics engine 760. For another embodiment, the plurality of motion-controlled devices is coordinated by a distributed algorithm that runs on this plurality. For example, for an embodiment, two drones (wherein each drone is a motion-controlled device) act as communication partners, one drone connects to AP while the other drone creates interference. One drone acts as AP (located at candidate AP location) while other drone measures AP signal strength from multiple locations.

Figure 8:
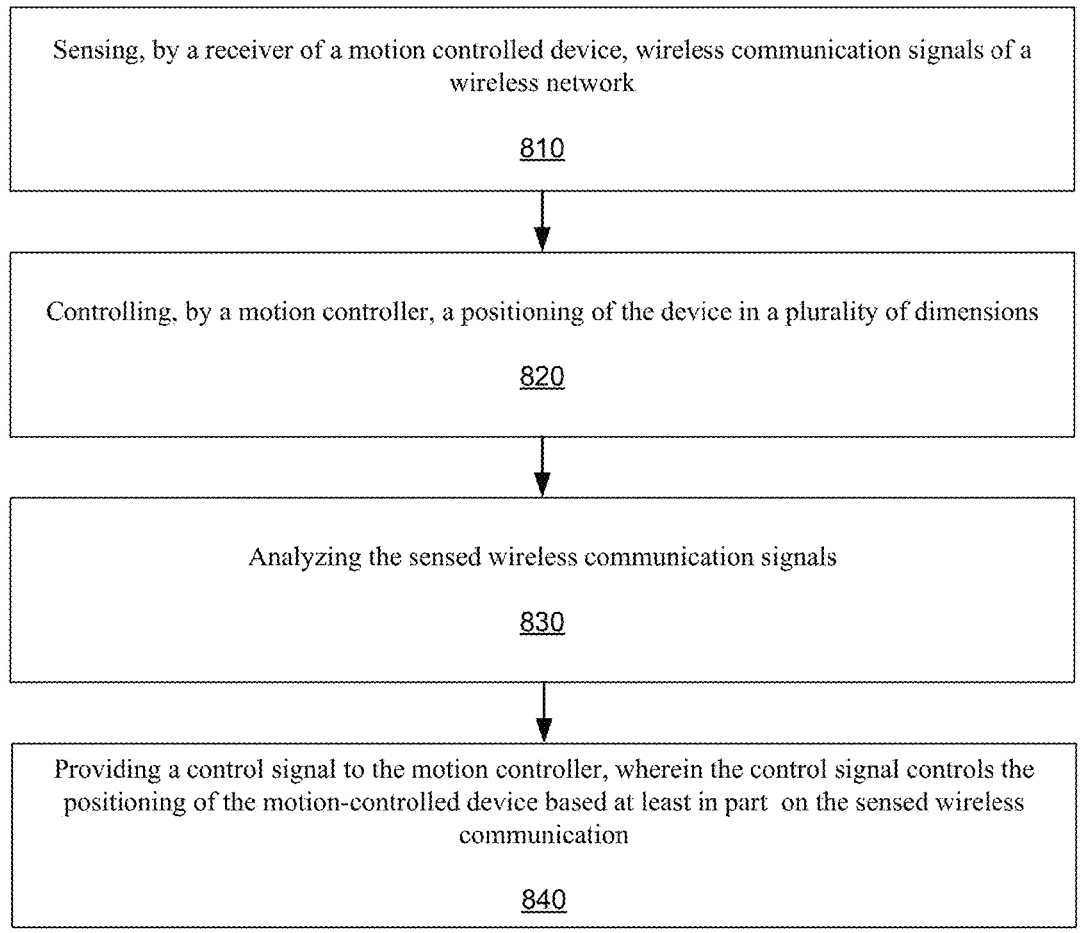
FIG. 8 is a flow chart that shows steps of a method of supporting deployment and operation of a wireless network, according to an embodiment.

FIG. 8 is a flow chart that shows steps of a method of supporting deployment and operation of a wireless network, according to an embodiment. A first step 810 includes sensing, by a receiver of a motion-controlled device, wireless communication signals of a wireless network. A second step 820 includes controlling, by a motion controller, a positioning of the motion-controlled device in a plurality of dimensions. A third step 830 includes analyzing the sensed wireless communication signals. A fourth step 840 includes providing a control signal to the motion controller, wherein the control signal controls the positioning of the motion-controlled device based at least in part on the sensed wireless communication signals.

Figure 19:
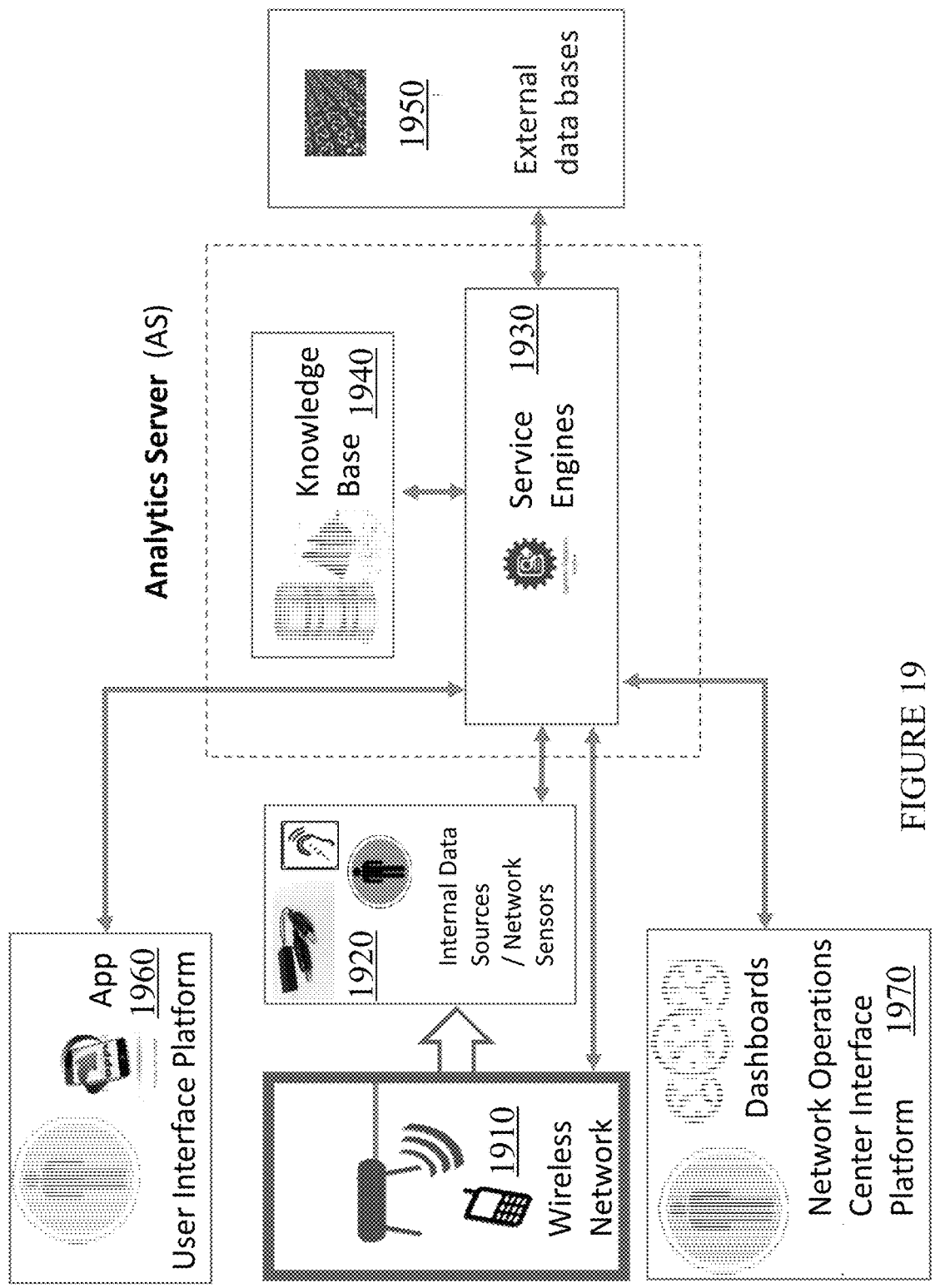
FIG. 19 shows a block diagram of a sense, model and control methodology for improving performance of a wireless network, according to an embodiment.

For the following described embodiments, the motion-controlled devices are implemented as, for example, the internal data sources and data sources 1920 of FIG. 19. Alternatively, or additionally, the motion-controlled devices are implemented as, for example, as at least a portion of the wireless network 1910. For example, for an embodiment, the motion-controlled devices operate as wireless devices or access nodes of the wireless network 1910. Alternatively, or additionally, the motion-controlled devices are implemented as, for example, as at least a portion of the service engines 1930. That is, for an embodiment, at least a portion of the service engines operate on one or more of the motion-controlled devices.

As least some embodiment includes an analytics engine that determines a problem exists by either receiving an indication that the problem exists, or by detecting that the problem exits. At least some embodiments include a "man-in-the-loop" which includes, for example, a user or a wireless network operator that provides additional input(s) and/or controls for the analytics engine. The analytics engine uses one or more of available resources to characterize the problem and provide actions for mitigating the problem.

Figure 9:
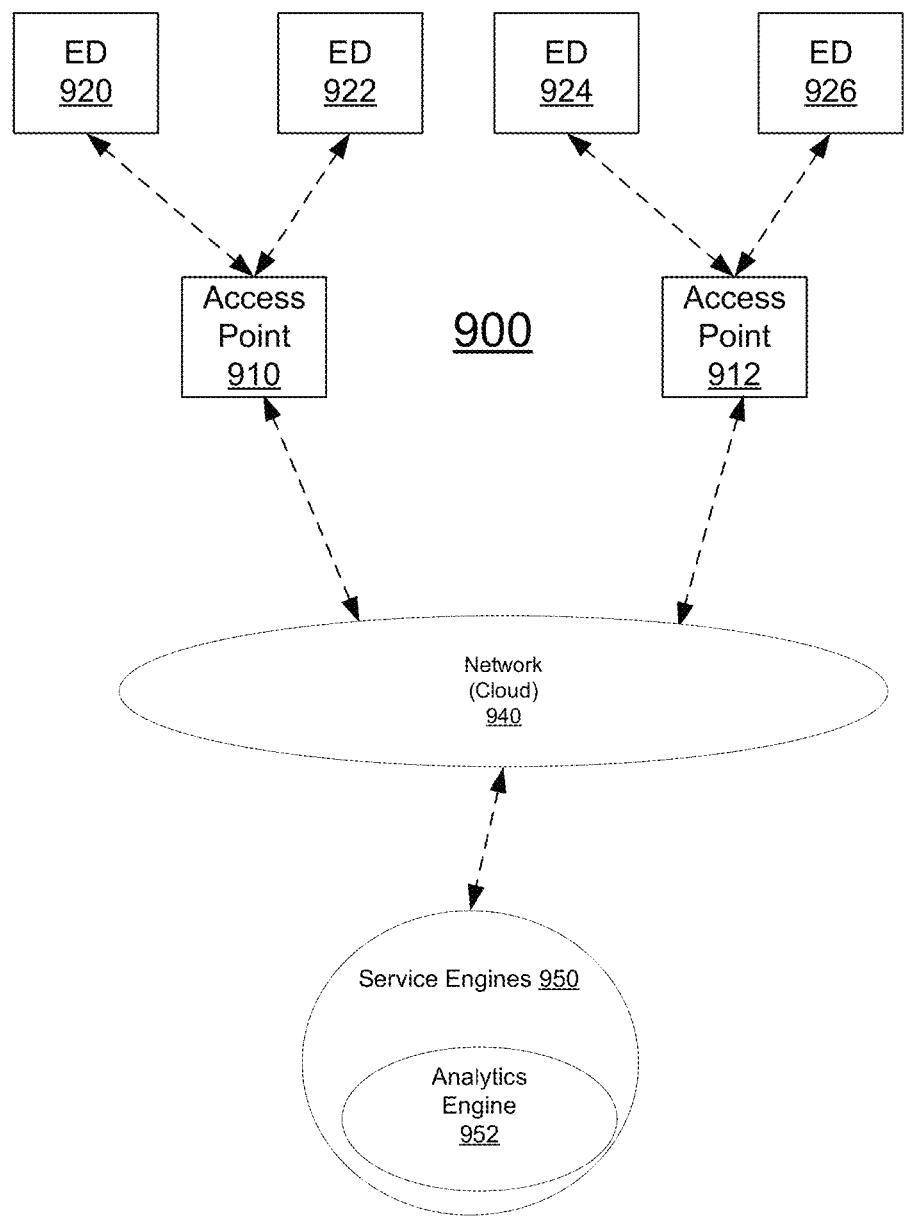
FIG. 9 shows a wireless network that includes an analytic engine operative to mitigate wireless networking problems, according to an embodiment.

FIG. 9 shows a wireless network 900 that includes an analytic engine 952 operative to mitigate wireless networking problems, according to an embodiment. As shown, multiple end devices (ED(s)) 920, 922, 924, 926 are connected to a network 940 through access points 910, 912. For at least some embodiments, the network 940 provides a communication channel between service engines 950 and the ED(s) 920, 922, 924, 926 and the access points 910, 912. For an embodiment, the service engines 950 include the analytics engine 952. While depicted as a single block, it is to be understood that the service engines 950 and the analytics engine 952 are functionally operating units that can be distributed amongst one or more servers or computers that are connectable to the network 940. For at least some embodiments, one of the previously describe motion-controlled devices may be operational as at least one of the ED(s) 920, 922, 924, 926 or one of the access points 910, 912. Further, as previously described, for at least some embodiments, one of the previously describe motion-controlled devices may be operational as at least a portion of the analytics engine.

For at least some embodiments, the analytics engine 952 is operative as a central intelligence for detection, analyzing, classifying, root-causing, or controlling the wireless network. For an embodiment, the analytics engine 952 mitigates a wireless networking problem of a wireless network.

For an embodiment, the analytics engine 952 determines a problem associated with the wireless network. Exemplary wireless network problems include network performance, and/or network connectivity problems. For an embodiment, the problem associated with the wireless network is determined by the analytics engine detecting the existence of a problem based on the state information. For an embodiment, the problem associated with the wireless network is determined by the analytics engine receiving identification notification of the existence of the problem from a user of a wireless device (for example, end device 920).

For an embodiment, the analytics engine 952 receives collected user input(s) and state information. The collected user input(s) include, for example, answers by the user to multiple choice questions that relate to the nature of the wireless networking problem, numeric input, or binary input (for example, whether a suggested solution did indeed mitigate the problem).

The state information includes, for example, sensor information, or variables read from network elements (not originating from a physical sensor). For an embodiment, the state information includes the entirety of information available at the analytics engine about the network at a certain point of time. For an embodiment, the sensor information includes physical measurements. For an embodiment, the state information includes a protocol state, and other quantities that are not specifically measured, but already present in memory.

For an embodiment, the analytics engine 952 maps a problem signature of the user input and the sensor information to at least one of a number of possible problem network conditions. While the term "signature" is used in the described embodiments, it is to be understood that this term can be generally interpreted as one or more variables (sensed measurements, user inputs) that are related to the problem.

For an embodiment, the problem signature includes at least one of a wireless device type, a type of access point that the wireless device is connected or attempting to connect to, or a network type. For an embodiment, the problem signature includes the wireless network topology. For an embodiment, the problem signature includes configuration data of the access point.

For an embodiment, the problem signature includes a data traffic type. For an embodiment, the problem signature includes measured data traffic transmission rates.

For an embodiment, the problem signature includes at least one of a deployment type, or applications that are currently in use in the network. For an embodiment, the problem signature includes a list of applications obtained from end device.

For at least some embodiments, mapping a problem signature of the user input and the sensor information with at least one of a number of possible problem network conditions includes comparing features of the problem signature with problem characterizations stored in the knowledge database. As previously described, the term "signature" is to be understood generally as one or more variables (sensed measurements, user inputs) that are related to the problem.

For at least some embodiments, the mapping implements an inference, where the nature of the problem is inferred from the problem signature. For an embodiment, the mapping includes applying one or more decision models to the problem signature. For an embodiment, the decision models are constructed based on multiple previously observed problem signatures and the instructions that led to successful mitigation of the problems of the previously observed problem signatures. For an embodiment, the decision models include one or more partitions of the set of possible problem signatures to a finite number of subsets, wherein each of the subsets maps to a particular instruction.

For an embodiment, the one or more partitions are specified by one or more of decision trees, closest neighbor mapping, table lookups, expert systems, probabilistic models of cause and effect.

For an embodiment, the mapping, decision models and/or partitions are constructed from multiple previously observed problem signatures and the instructions that led to their successful mitigation. For an embodiment, the previously observed problem signatures and the instructions that led to their successful mitigation originate from the same wireless network. For another embodiment, the previously observed problem signatures and the instructions that led to their successful mitigation originate from a plurality of wireless networks, wherein one of the plurality of networks is wireless network.

For an embodiment, the mapping, decision models and/or partitions are constructed by an optimization that enhances the probability of successful problem mitigation.

For an embodiment, the analytics engine 952 determines instructions for alleviating the problem based on the mapping of the problem signature.

For an embodiment, the analytics engine provides the instructions. For an embodiment, the instructions includes actions that can be taken to mitigate of eliminate the effects of the problem. For at least some embodiments, the instructions in include one or more of device action, operator action, user action, operator action, and/or equipment update. Exemplary device action includes a transmission channel change, a modification of a wireless transmission parameter, setting modulation and coding, and/or setting a MIMO (multiple-input, multiple-output) mode. Exemplary user action includes changing a device location, changing an application setting and/or executing a test. Exemplary operator action includes changing a device configuration, changing a network configuration, and/or rebooting a network component. Exemplary equipment modification and update include adding an additional access point and/or repositioning an access point. It is to be understood that these list are exemplary and that many other such actions may be utilized.

Figure 10:
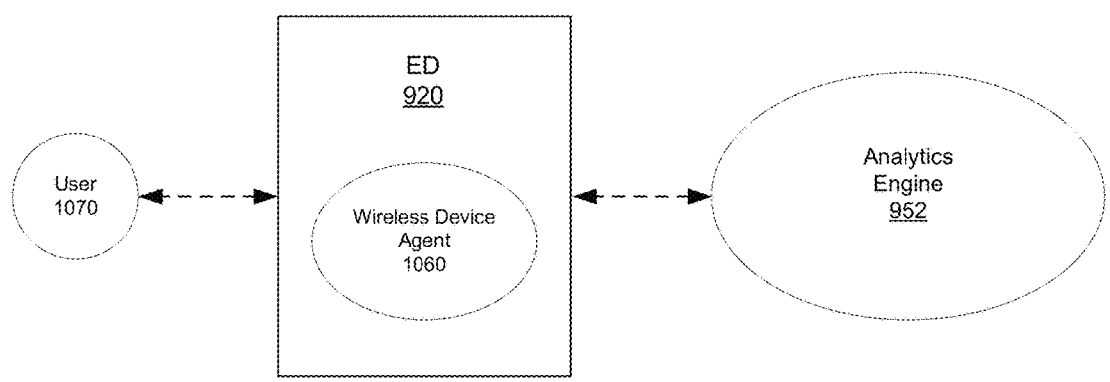
FIG. 10 shows an analytics engine interfaced with a wireless device agent of an end device, according to an embodiment.

FIG. 10 shows an analytics engine 952 interfaced with a wireless device agent 1060 of an end device 920, according to an embodiment. For at least some embodiments, the analytics engine 952 activates the wireless device agent 1060 of the end (wireless) device 920. For at least some embodiments a communication channel is established between the wireless device agent 1060 and the analytics engine 952, and wherein the wireless device agent 1060 is operative to interpret commands of a user 1070 of the wireless device 920, display information to the user 1070, and interface with hardware operations of the wireless device 920. Further, the wireless device agent 1060 collects the user inputs. Further, for at least some embodiments, the wireless device agent 1060 collects sensor information of the wireless device 920. The user inputs and the collected sensor information is feedback to the analytics engine 952, and can be used to diagnose and provide actions for mitigating the problem.

For at least some embodiments, the analytics engine 952 provides the instructions to the wireless device agent 1060, and further the wireless device agent 1060 applies the instruction to mitigate the detected problem.

For at least some embodiments, the analytics engine 952 provides the instructions to the wireless device agent 1060, and further the wireless device agent 1060 initiates an action based on the instruction, thereby enabling additional analysis of the problem. That is, the information (user inputs and sensed information) can be used to generate instructions. The instructions can include actions for mitigating the problem, or for providing additional information for diagnosing the problem. That is, mitigating the problem can include an iterative process of analyzing collected and sensed information, taking action, collecting information after taking action, and then preforming further analysis. The result of taking action in a previous iteration is used in the generation of the instructions for problem mitigation in subsequent iterations.

At least some embodiments include the wireless device agent 1060 communicating the instruction to a user of the wireless device 920, thereby allowing the user to implement the instruction. Further, for at least some embodiments, the analytics engine provides the instructions to the wireless device agent, and further comprising the wireless device agent 1060 communicating an action to be performed by the user, thereby enabling additional analysis of the problem.

In at least some embodiments, the wireless device agent 1060 is an application that runs on the end device 920. In at least some embodiments, the wireless device agent 1060 runs in a web browser. In at least some embodiments, the wireless device agent 1060 is part of device driver in the end device 920. In at least some embodiments, the wireless device agent 1060 is part of the operating system of the end device 920.

Figure 11:
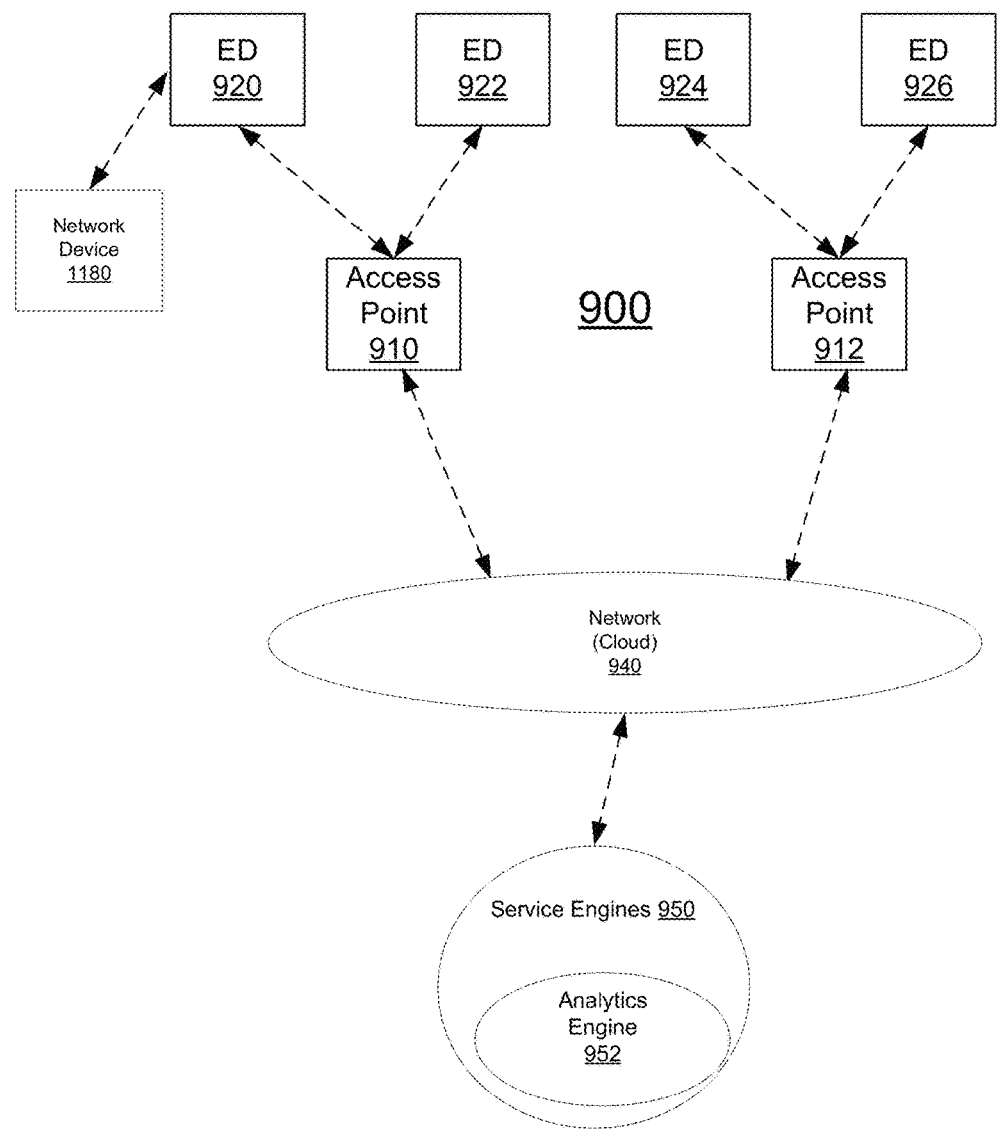
FIG. 11 shows a wireless network that includes an analytic engine and a network device operative to mitigate wireless networking problems, according to an embodiment.

FIG. 11 shows a wireless network that includes an analytic engine 952 and a network device 1180 operative to assist mitigation of wireless networking problems, according to an embodiment. For at least some embodiments, the network device includes a separate device that provides additional information that can be used for determining the existence of the problem and for diagnosing the problem. Further, network device can be utilized for mitigating the effects of the problem. For an embodiment, the network device 1180 includes at least one of the previously described motion-controlled devices.

An embodiment includes the analytics engine 952 receiving information from the network device 1180. As shown in FIG. 11, the analytics engine 952 receives information from the network device 1180 through the wireless device agent. That is, the network device 1180 is connected to the end device 920. The end device 920 includes a wireless device agent that communicates the information of the network device 1180 to the analytics engine 952 through, for example, the access point 910 and the network 940. That is, for an embodiment, the wireless device agent receives inputs or sense information from the network device 1180, which is communicated to the analytics engine 952.

For an embodiment, a network device agent of the network device 1180 is operative to interpret commands of a user of the wireless device (ED 920). For an embodiment, the network device agent of the network device 1180 is operative to convey information to the user, for example through a display or a visual indicator located on the network device 1180.

Figure 12:
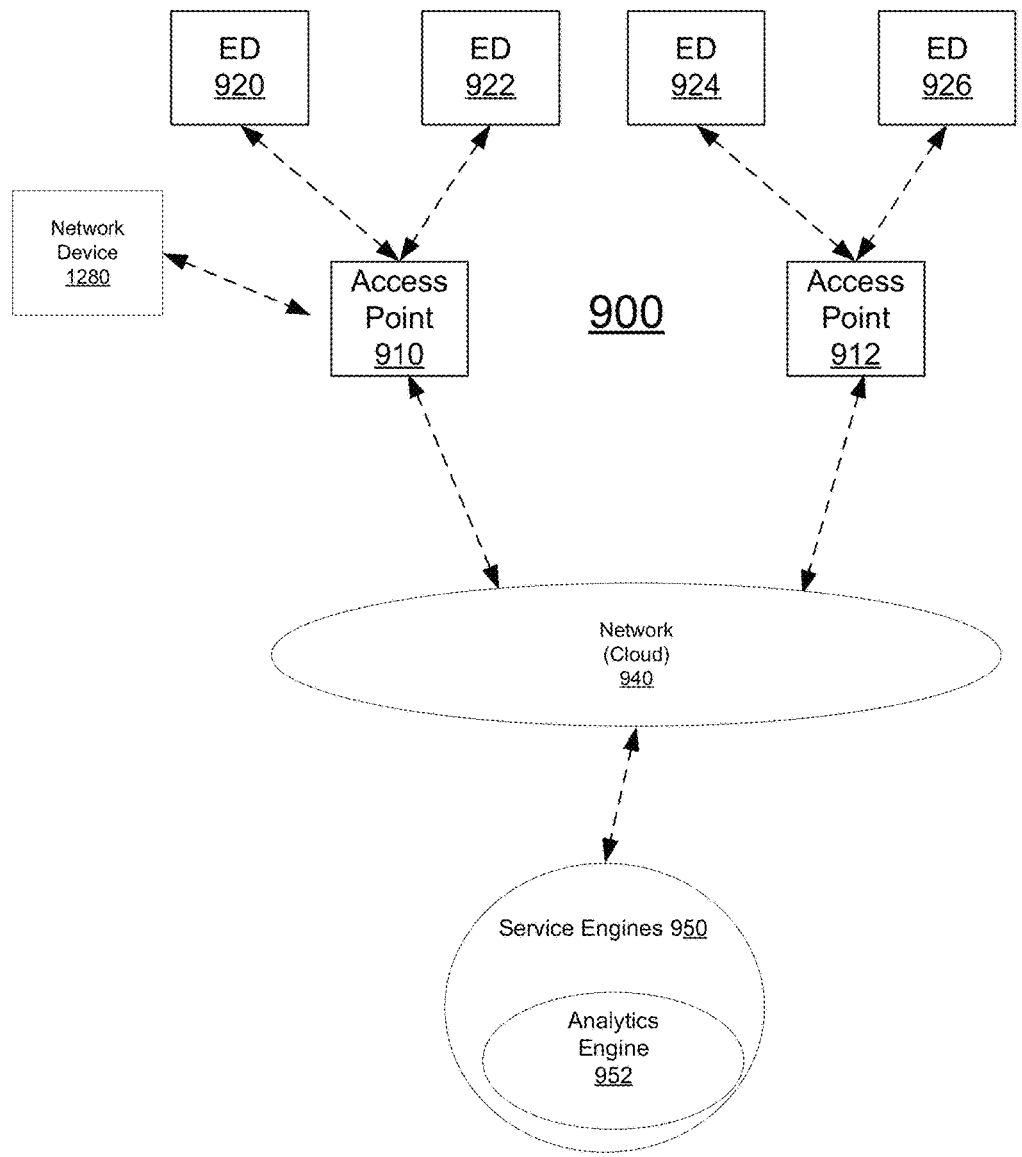
FIG. 12 shows a wireless network that includes an analytic engine and a network device operative to mitigate wireless networking problems, according to another embodiment.

FIG. 12 shows a wireless network that includes an analytic engine 952 and a network device 1280 operative to assist mitigation of wireless networking problems, according to another embodiment. While the network device 1180 of FIG. 11 communicated with the wireless device agent of the end device 920, the network device 1280 communicates directly with the network 940 through, for example, the access point 910. For an embodiment, the network device 1280 includes at least one of the previously described motion-controlled devices.

For an embodiment, the network device 1280 is a device that is operative to collect sensor information about the wireless network and transmit the sensor information to the analytics engine 952 for inclusion in the problem signature.

For at least some embodiments, the network device 1280 is embedded in existing components of the network, for example access points, access point controllers, routers, or switches.

For an embodiment, the network device 1280 is operable to assist in determining whether a determined problem is located between the end device 920 and the access point 910, or between the access point 910 and the network 940. That is, the network device 1280 is operable to bisect the problem located between the wireless device (ED 920) and the network 940. That is, is the problem located between the wireless device (ED 920) and the access point 910, or between the access point 910 and the network 940.

For at least some embodiments, the bisection is performed by temporarily providing a secondary channel between the end device 920 and the network 940 via the network device 1280. If the secondary channel between the end device 920 and the network 940 is operative, it can be concluded that the original problem is located between the end device 920 and the access point 910, as opposed to between the access point 910 and the network 940. If it is not operative, it can be concluded that the original problem is located between the access point 910 and the network 940.

Figure 13:
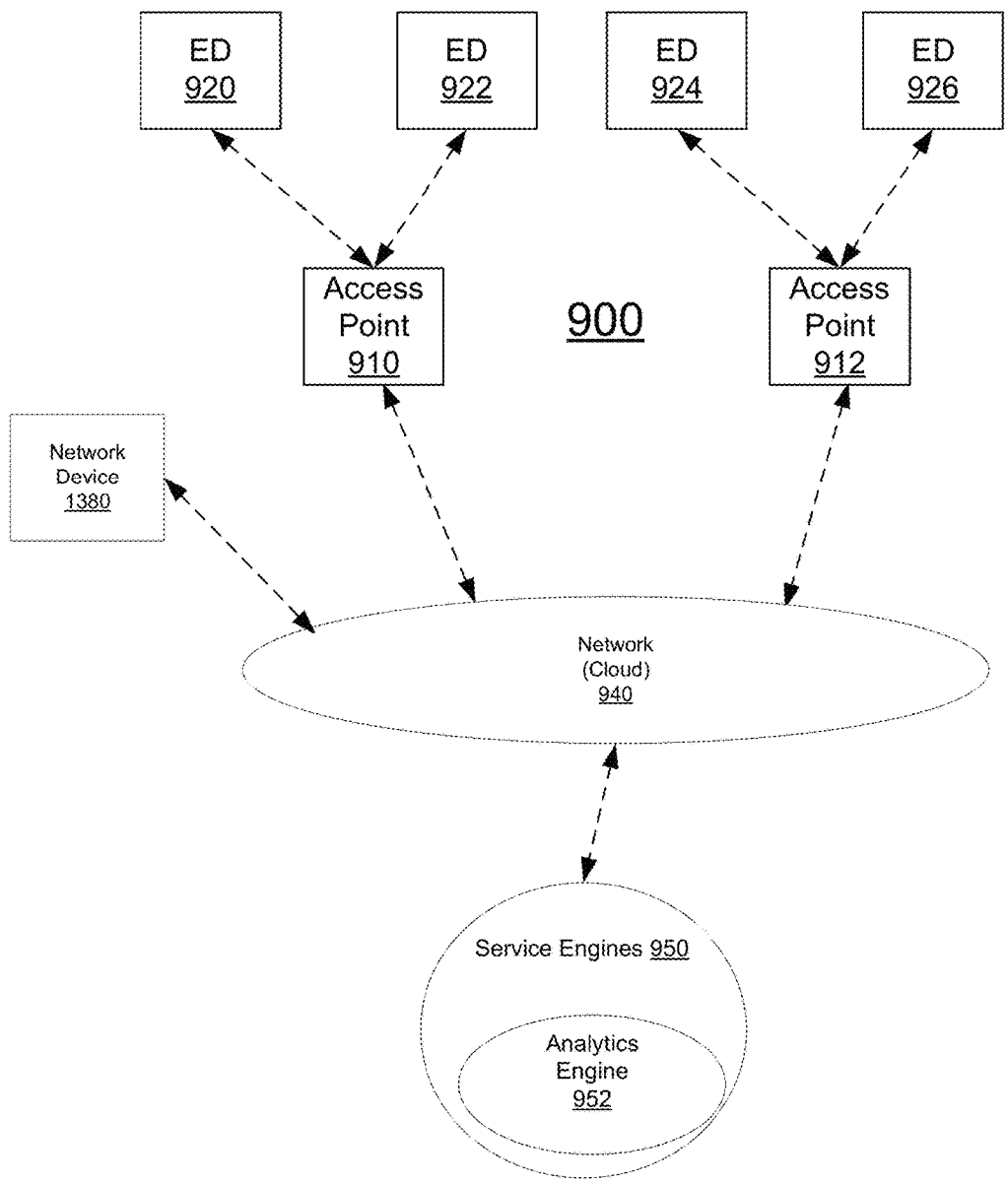
FIG. 13 shows a wireless network that includes an analytic engine and a network device operative to mitigate wireless networking problems, according to another embodiment.

FIG. 13 shows a wireless network that includes an analytic engine 952 and a network device 1380 operative to assist in mitigating wireless networking problems, according to another embodiment. An embodiment includes activating a network device agent of the network device 1380. For an embodiment, the network device agent of the network device 1380 is operative to interpret commands of a user and display information to the user, wherein the user can be a network operator. For an embodiment, a communication channel is established between the network device agent and the analytics engine 952. For an embodiment, the network device 1380 includes at least one of the previously described motion-controlled devices.

For at least some embodiments, the network device agent of the network device 1380 is operative to collect the user inputs, select a wireless device from the wireless network based on the previously determined problem in the wireless network, and collect state information that includes information from the wireless device. In an embodiment, the selection is based on one or more of the problem, the structure the wireless network, and other state information. In an embodiment, the wireless device is selected because the wireless device is affected by the problem.

For an embodiment, the state information includes information of the wireless device. For an embodiment, the state information includes information of other devices that are at least one of within a proximate vicinity of the wireless device or includes at least a threshold number of common characteristics. For an embodiment, the state information includes inputs of a user of the wireless device. For an embodiment, the state information includes global knowledge of a Network Operations Center (NOC). For an embodiment, the state information includes inputs collected from a second user. For an embodiment, the state information includes collected network state information from other sources than the wireless device (from other devices in the vicinity, of similar type).

For at least some embodiments, the analytics engine 952 provides the instructions to the network device agent of the network device 1380. Further, for an embodiment, the network device agent applies the instruction to mitigate the detected problem. For an embodiment, the network device agent initiates an action based on the instruction, thereby enabling additional analysis of the problem. For an embodiment, the network device agent communicates an action to be performed by the user (network operator), thereby enabling additional analysis of the problem. The result of taking action in a previous iteration will inform the instructions for problem mitigation in subsequent iterations.

While each of the network device 1180, 1280, 1380 is similarly designated as a "network device", it is to be understood that each may operate similarly or differently than the others.

Figure 14:
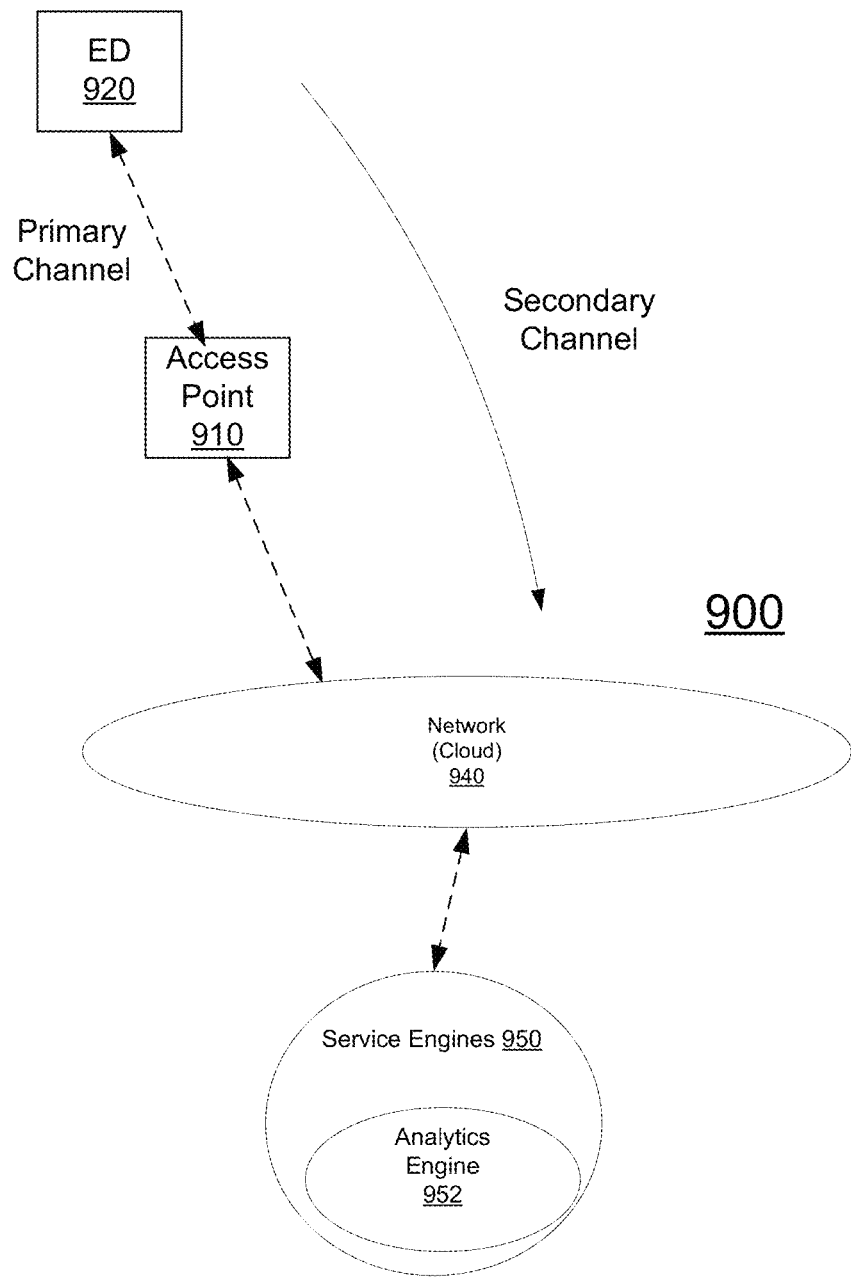
FIG. 14 shows an end device that is interfaced with a network through primary channel and a secondary channel, according to an embodiment.

FIG. 14 shows an end device that is interfaced with a network through primary channel and a secondary channel, according to an embodiment. The secondary channel provides the analytics engine 952 a way to communicate with the wireless device agent if the primary channel is inoperative, compromised, operating below a predetermined threshold, or undesirable for some other reason. For example, the secondary channel can be used by the wireless device agent to indicate to the analytics engine that the wireless device cannot communicate through the primary channel. For an embodiment, the secondary channel is provided by a separate network. More specifically, for an embodiment, the primary channel is provided by a WiFi network, while the secondary channel is provided by a cellular wireless network.

For an embodiment, the primary channel is operative to support an application of the user, while the secondary channel is operative to aid diagnosis of the problem. That is, for example, if the primary channel is currently used for an application that the user is running, a diagnosis function of the analytics engine will use secondary channel so as not to further impair the primary channel.

Figure 15:
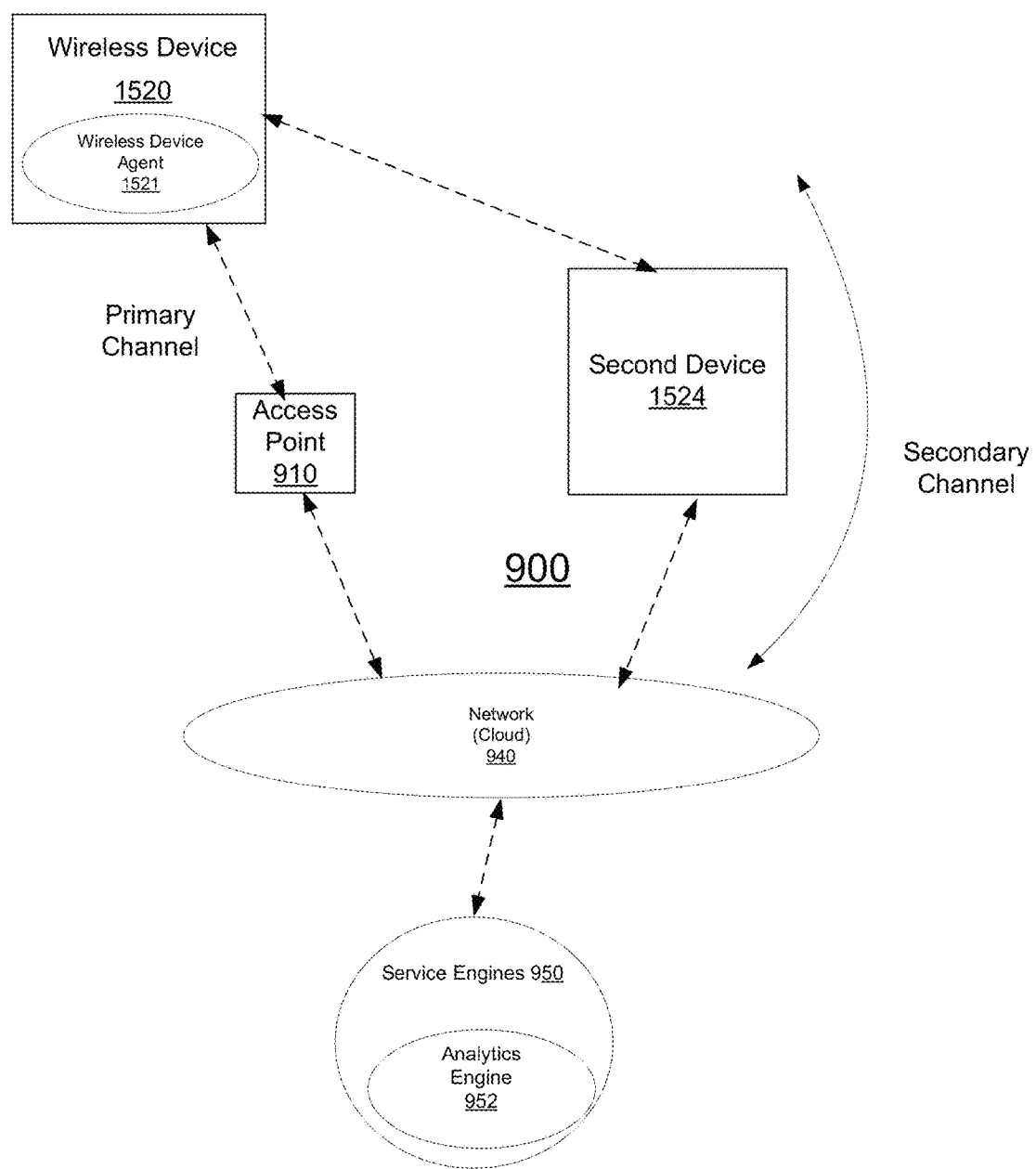
FIG. 15 shows a wireless device that is interfaced with a network through a primary channel, and through a secondary channel provided by a second device, according to an embodiment.

FIG. 15 shows a wireless device 1520 that is interfaced with a network 940 through a primary channel, and through a secondary channel provided by a second device 1524, according to an embodiment. The embodiment of FIG. 15 is similar to the embodiment of FIG. 14, wherein the second device 1524 provides the secondary channel. The wireless device 1520 includes a wireless device agent 1521 that operative in conjunction with the analytics engine 952 to mitigate the effects of identified wireless networking problems. For an embodiment, the network device 1520 includes at least one of the previously described motion-controlled devices.

Figure 16:
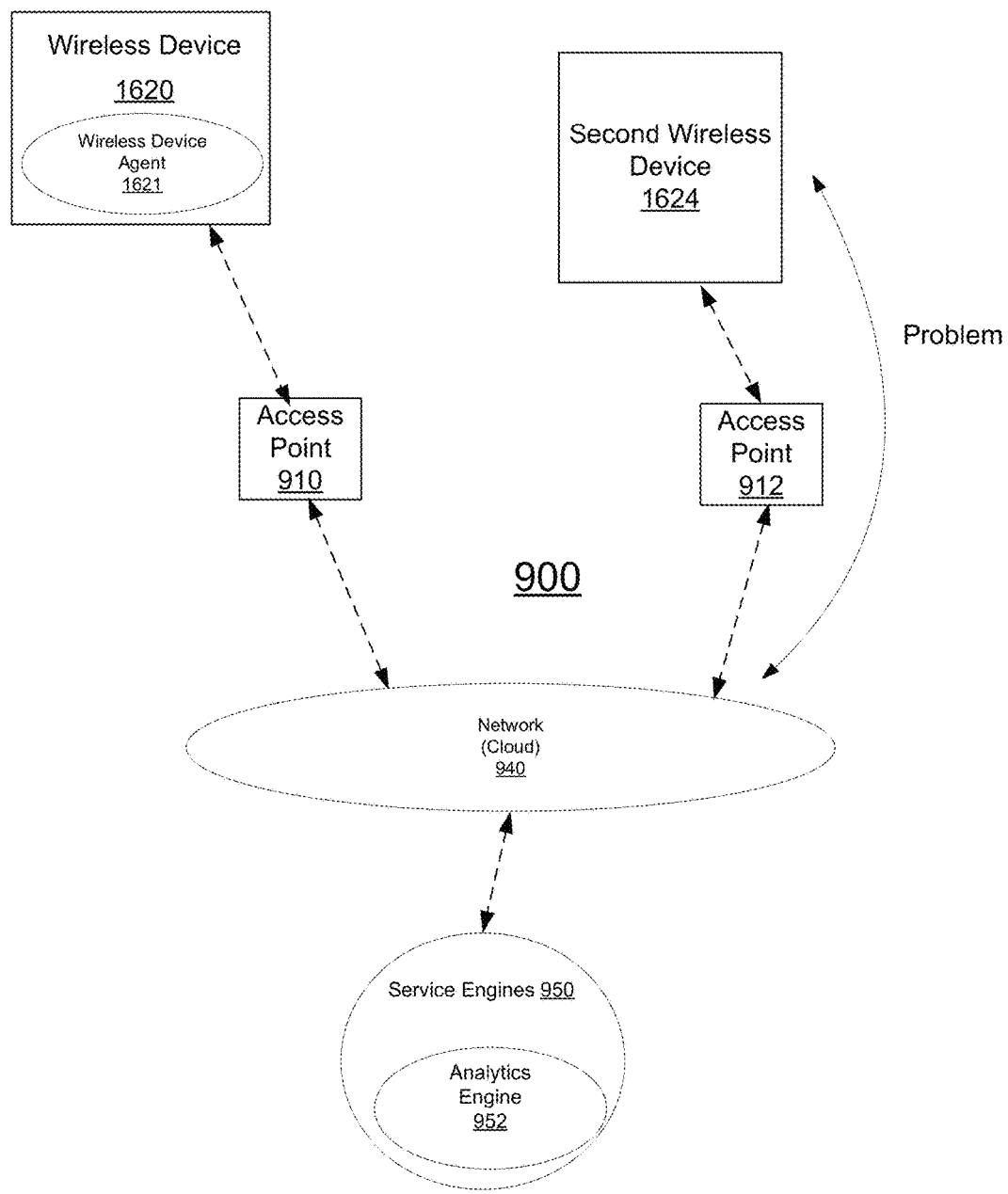
FIG. 16 shows an analytics engine operative to allow a wireless device to facilitate mitigating a wireless network problem of a second wireless device, according to an embodiment.

FIG. 16 shows an analytics engine 952 operative to allow a wireless device 1620 to facilitate mitigating a wireless network problem of a second wireless device 1624, according to an embodiment. That is, for an embodiment, the problem includes a network problem between the second wireless device 1624 and the network 940, and the second wireless device 1624 has the problem to be diagnosed, and hopefully mitigated. For example, the second wireless device 1624 may include a printer that has a connection problem, and the wireless device 1620 is a mobile phone of the user that is being used to diagnose the connection problem of the second device 1624 (the printer). For an embodiment, the wireless device 1620 (and wireless device agent) is a diagnosis device used by a field technician. For an embodiment, the network device 1620 includes at least one of the previously described motion-controlled devices.

Figure 17:
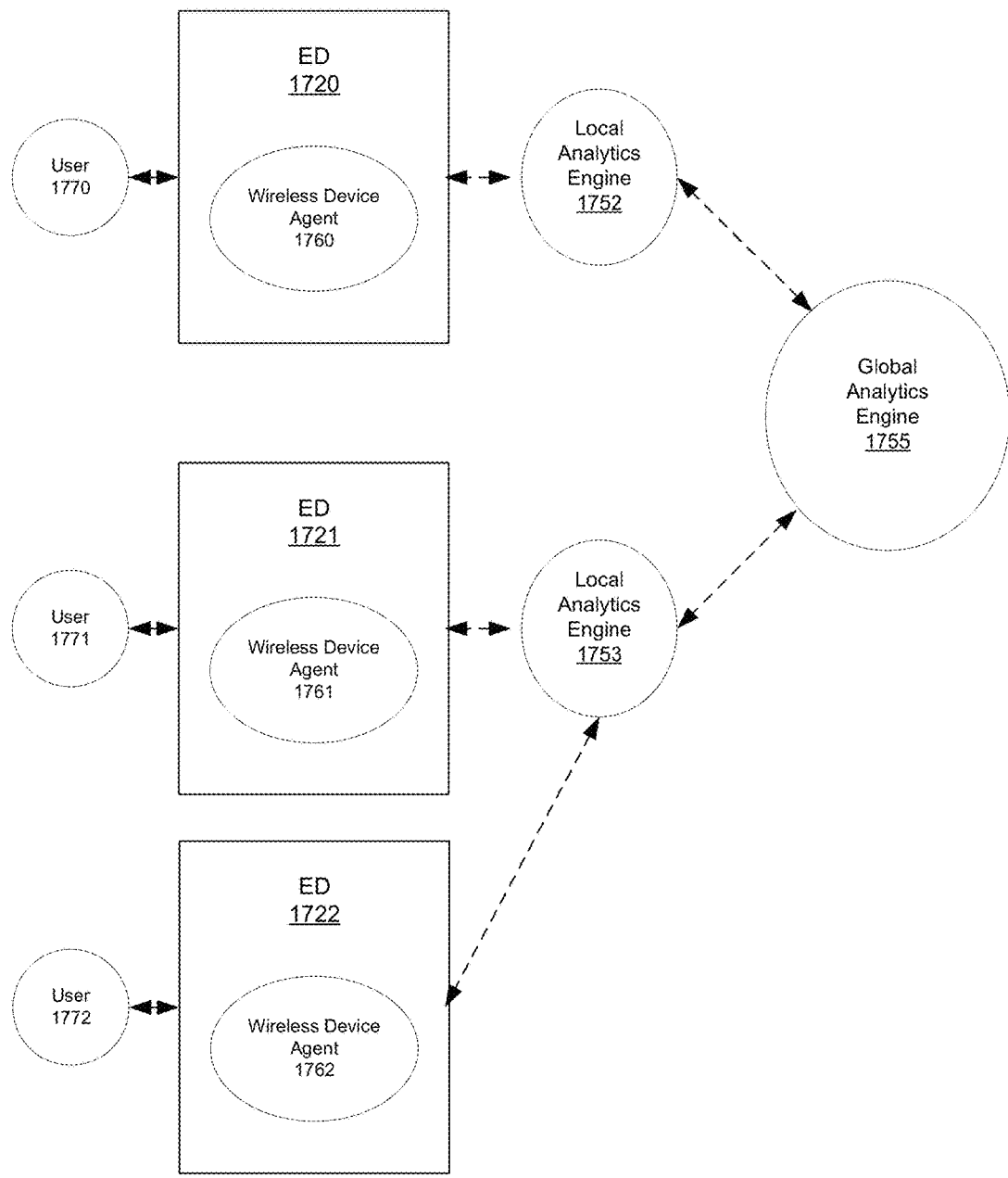
FIG. 17 shows multiple wireless devices that are interfaced with corresponding local analytics engines and a global analytics engine, according to an embodiment.

FIG. 17 shows multiple wireless devices 1720, 1721, 1722 (that include wireless device agents 1760, 1761, 1762) that are interfaced with corresponding local analytic engines 1752, 1753 and a global analytic engine 1755, according to an embodiment. For an embodiment, the local analytics engines 1752, 1753 are operable to process all of the collected user input (from users 1770, 1771, 1772) and the state information. This information can include sensitive information that user(s) may want control for privacy reasons. As shown, the local analytics engine 1753 is operable to server multiple wireless devices 1721, 1722 and multiple users 1771, 1772. For example, the local analytics engine 1752 may be running on the end device 1720 while the local analytics engine 1753 may be running on an on-premises computer. For at least some embodiments, at least one of the wireless devices 1720, 1721, 1722 includes a previously described motion-controlled device.

For an embodiment, the global analytics engine 1755 is operable to process a subset of the collected user input and the state information. The subset includes, for example, non-secure information, while not including privacy-sensitive information. While the global analytics engine 1755 works with a subset of information, the global analytics engine 1755 has the benefit of having access to information from multiple sources (from, for example, multiple wireless device agents). Therefore, the global analytics engine 1755 can make inferences across different networks. In an embodiment, each local analytics engine 1752, 1753 is located in a customer's network. For at least some embodiments, the global analytics engine 1755 provides inference across customers, wherein a local analytics engine is associated with each of the customers.

For at least some embodiments, the analytics engine includes a plurality of local analytics engines and a global analytics engine, wherein each of the plurality of local analytics engines is operable to process the collected user input and the state information corresponding to its associated devices, and wherein the global analytics engine is operable to process a subset of the collected user input and the state information of each local analytics engine, jointly across all local analytics engines.

Figure 18:
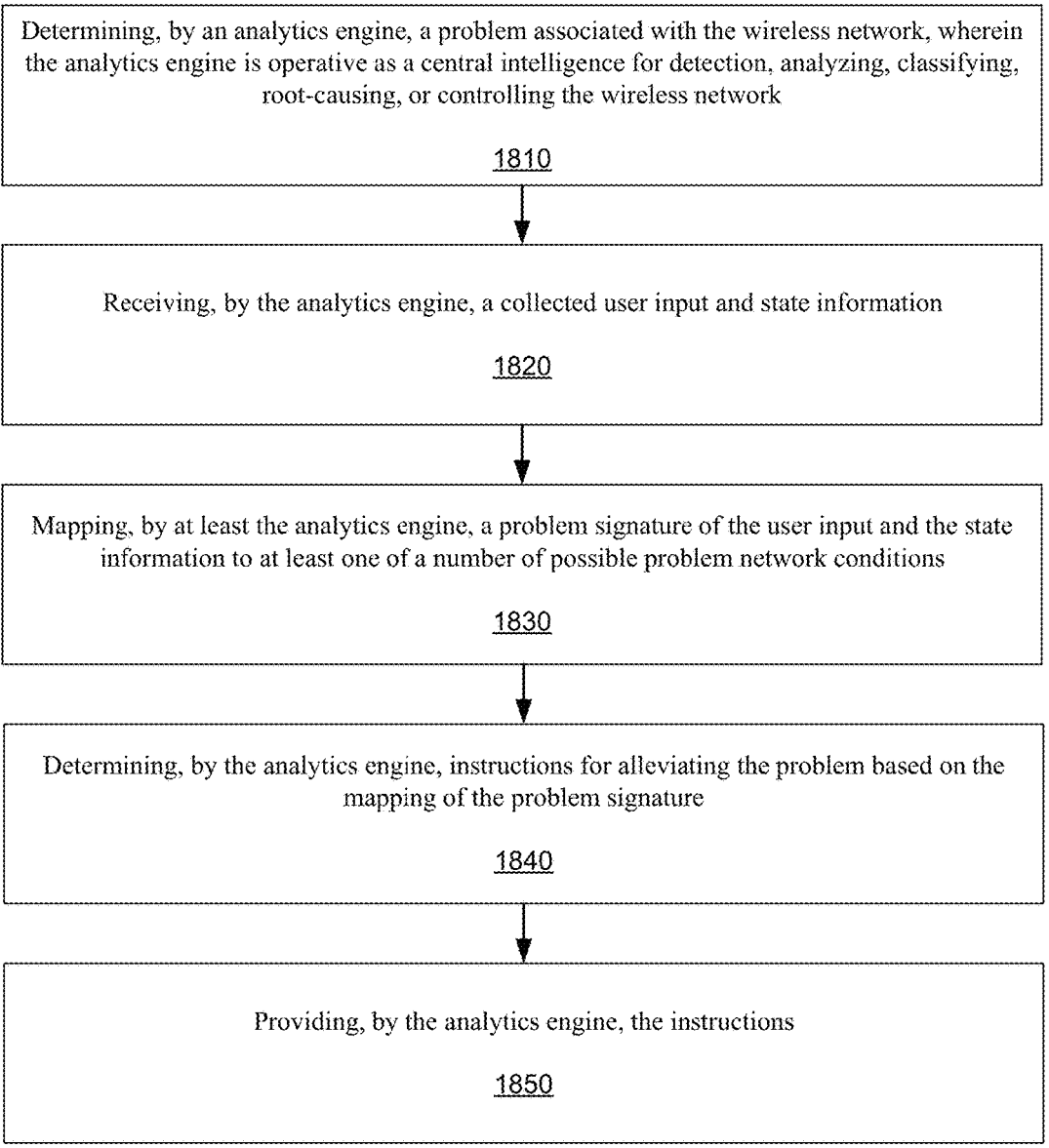
FIG. 18 is a flow chart that includes steps of a method of mitigating a problem of a wireless mesh network, according to an embodiment.

FIG. 18 is a flow chart that includes steps of a method of mitigating a problem of a wireless mesh network, according to an embodiment. A first step 1810 includes determining, by an analytics engine, a problem associated with the wireless network, wherein the analytics engine is operative as a central intelligence for detection, analyzing, classifying, root-causing, or controlling the wireless network. A second step 1820 includes receiving, by the analytics engine, a collected user input and state information. A third step 1830 includes mapping, by at least the analytics engine, a problem signature of the user input and the state information to at least one of a number of possible problem network conditions. A fourth step 1840 includes determining, by the analytics engine, instructions for alleviating the problem based on the mapping of the problem signature. A fifth step 1850 includes providing, by the analytics engine, the instructions.

As previously described, for at least some embodiments, the collected user input(s) include, for example, answers to multiple choice questions that relate to the nature of the wireless networking problem, numeric input, or binary input (for example, whether a suggested solution did indeed mitigate the problem).

As previously described, for at least some embodiments, the state information includes the entirety of information available at the analytics engine about the network at a certain point of time. For an embodiment, the state information includes sensor information. For an embodiment, the sensor information includes physical measurements. For an embodiment, the state information includes a protocol state, other things that are not specifically measured, but already present in memory.

As previously described, at least some embodiments further include activating an wireless device agent of a wireless device, wherein a communication channel is established between the wireless device agent and the analytics engine, and wherein the wireless device agent is operative to interpret commands of a user of the wireless device, display information to the user, interface with hardware operations of the wireless device. The wireless device agent is operative to collect the user inputs and at least a portion of the state information of the wireless device.

As previously described, for an embodiment, the analytics engine provides the instructions to the wireless device agent, and further the wireless device agent applies the instruction to mitigate the detected problem. For an embodiment, the agent initiates an action based on the instruction, thereby enabling additional analysis of the problem.

As previously described, for an embodiment, the wireless device agent communicates the instruction to a user of the wireless device, thereby allowing the user to implement the instruction. For an embodiment, the analytics engine provides the instructions to the wireless device agent, and the wireless device agent communicates an action to be performed by the user, thereby enabling additional analysis of the problem.

The instructions can include actions for mitigating the problem, or for providing additional information for diagnosing the problem. That is, mitigating the problem can include an iterative process of analyzing collected and sensed information, taking action, collecting information after taking action, and then preforming further analysis. The result of taking action in a previous iteration is used in the generation of the instructions for problem mitigation in subsequent iterations.

As previously described, for an embodiment, the communication channel includes a primary channel and a secondary channel, and wherein the wireless device agent communicates with the analytics engine through the secondary channel when the primary channel is operating below a predetermined threshold, or undesirable for other reason.

As previously described, for an embodiment, the communication channel includes a primary channel and a secondary channel, wherein the primary channel is operative to support an application of the user, while the secondary channel is operative to aid diagnosis of the problem. For example, the primary channel may be currently used for an application that the user is running, and the diagnosis function of the analytics engine will use secondary channel so as not to further impair the primary channel.

As previously described, for an embodiment, the analytics engine receives information from a network device, and the wireless device agent receives inputs or sense information from the network device. For an embodiment, network device communicates with the wireless device agent only, but not to the analytics engine. For an embodiment, the analytics engine may still receive information from the network device, but only through the wireless device agent. As previously described, the network device can assist in bisecting the problem located between the wireless device and the network. That is, whether the problem located between the wireless device and an access node, or between the access node and the network.

For an embodiment, the network device is operational to provide the communication channel between the wireless device and the analytics engine. That is, the network device acts as a relay for the linking between the wireless device agent and analytics engine. Further, for an embodiment, the network device helps in diagnosing the problem. For example, the network device may be a wireless probe or another access point. Further, for an embodiment, the network device is second device is polled in by the wireless device agent or by the analytic engine.

As previously described, at least some embodiments further include activating a network device agent of a network device, wherein a communication channel is established between the network device agent and the analytics engine, and wherein the network device agent is operative to interpret commands of a user of the network device and display information to the user. Further, these embodiments further include collecting, by the network device agent, the user inputs, selecting a wireless device from the wireless network based on the previously determined problem in the wireless network, and collecting, by the network device agent, at least a portion of the state information that includes information from the wireless device. As previously described, for an embodiment, the selection is based on one or more of the problem, the structure the wireless network, and other state information. In an embodiment, the wireless device is selected because it is affected by the problem.

As previously described, for an embodiment, the state information includes information of the wireless device.

As previously described, for an embodiment, the state information includes information of other devices that are at least one of within a proximate vicinity of the wireless device or includes at least a threshold number of common characteristics.

As previously described, for an embodiment, the state information includes inputs of a user of the wireless device.

As previously described, for an embodiment, the state information includes global knowledge of the NOC.

As previously described, for an embodiment, the analytics engine provides the instructions to the network device agent, and further comprising the network device agent applying the instruction to mitigate the detected problem. For an embodiment, the network device agent initiates an action based on the instruction, thereby enabling additional analysis of the problem. For an embodiment, the network device agent communicates an action to be performed by the user, thereby enabling additional analysis of the problem.

As previously described, for an embodiment the problem includes a network problem between a second wireless device and the network. That is, for example, the second device has the problem to be diagnosed and mitigated. For example, the second wireless device may be a printer that has a connection problem, and the wireless device is a mobile phone of the user that is being used to diagnose the connection problem of the second device (the printer).

As previously described, for an embodiment, the second device receives the instructions from the from the analytics engine.

As previously described, for an embodiment the second device acts as relay for wireless device.

As previously described, for an embodiment the problem signature includes at least one of a wireless device type, a type of access point that the wireless device is connected or attempting to connect to, a network type. For an embodiment, the problem signature includes the wireless network topology. For an embodiment, the problem signature includes configuration data of the access point.

As previously described, for an embodiment the problem signature includes a data traffic type. For an embodiment, the problem signature includes measured data traffic transmission rates.

As previously described, for an embodiment the problem signature includes at least one of a deployment type, or applications that are currently in use in the network. For an embodiment, the problem signature includes a list of applications obtained from end device.

As previously described, for an embodiment mapping the problem signature of the user input and the sensor information with at least one of a number of possible problem network conditions includes comparing features of the problem signature with problem characterizations stored in a knowledge database. As previously described, the term "signature" is to be understood generally as one or more variables (sensed measurements, user inputs) that are related to the problem.

As previously described, for at least some embodiments, the mapping implements an inference, where the nature of the problem is inferred from the problem signature. For an embodiment, the mapping includes applying one or more decision models to the problem signature. For an embodiment, the decision models are constructed based on multiple previously observed problem signatures and the instructions that led to successful mitigation of the problems of the previously observed problem signatures. For an embodiment, the decision models include one or more partitions of the set of possible problem signatures to a finite number of subsets, wherein each of the subsets maps to a particular instruction.

For an embodiment, the one or more partitions are specified by one or more of decision trees, closest neighbor mapping, table lookups, expert systems, probabilistic models of cause and effect.

For an embodiment, the mapping, decision models and/or partitions are constructed from multiple previously observed problem signatures and the instructions that led to their successful mitigation. For an embodiment, the previously observed problem signatures and the instructions that led to their successful mitigation originate from the same wireless network. For another embodiment, the previously observed problem signatures and the instructions that led to their successful mitigation originate from a plurality of wireless networks that includes the same wireless network.

For an embodiment, the mapping, decision models and/or partitions are constructed by an optimization that enhances the probability of successful problem mitigation.

For at least some embodiments, the analytics engine receives second state information from a network device, and wherein matching the problem signature additionally includes matching the second state information received from the network device.

As previously described, for an embodiment the analytics engine includes a local analytics engine and a global analytics engine, wherein the local analytics engine is operable to process all of the collected user input and the state information, and wherein the global analytics engine is operable to process a subset of the collected user input and the state information.

For at least some embodiments, while the global analytics engine works with a subset of information, the global analytics engine has the benefit of having access to information from multiple sources (multiple local analytics engines). Therefore, the global analytics engine can make inferences across different networks. In an embodiment, each local analytics engine is located in a customer's network. For at least some embodiments, the global analytics engine provides inference across customers, wherein a local analytics engine is associated with each of the customers.

As previously described, for at least some embodiments, the analytics engine includes a plurality of local analytics engines and a global analytics engine, wherein each of the plurality of local analytics engines is operable to process the collected user input and the state information corresponding to its associated devices, and wherein the global analytics engine is operable to process a subset of the collected user input and the state information of each local analytics engine, jointly across all local analytics engines.

At least some embodiments for addressing problems in wireless network include sensing a variety of information directly or indirectly related to the wireless network, building comprehensive models of the wireless network, and then exploiting these models to derive anomaly reports, problem diagnosis and recommended changes to network settings.

Implemented through automatic control or through man-in-the-loop interventions, these outcomes can be used to improve both user experience and operator costs.

For at least some embodiments, the sensing function is broad and includes wireless sensors that work in-band to the target network, wired sensors that tap data at various end points in the wired segments of network and other sensors such as imaging sensor, occupancy sensor, audio sensor, other radio sensor, light sensor etc. to support comprehensive model building.

For at least some embodiments, the modeling of the wireless network and the related radio environment captures the complex interactions of the elements in the wireless network including path losses, channel condition, as well as the other in-band networks or interferers. Such network models held in databases may also include user locations, user movement, application being used, characteristics of the user device, user presence/location occupancy, user identity and profile etc. For at least some embodiments, the model techniques include multi-category models, lists, if then rules and other techniques, and formats. The modeling function not only depends on internally sensed data but also on data obtained from external databases.

For at least some embodiments, the controlling or output function includes automatic (direct) control of network parameters, or man-in-the-loop interventions including interactive diagnostic support or recommendations to network operators or to end users who can take corrective action. These control or output function are generated by various Service Engines that interact with various entities such as internal data sources/sensors, end devices with associated users, NOC (Network Operations Center) with associated operators, and knowledge databases.

While the modeling function gathers and organizes data to support improvement of user experience or operator costs, such data may also be useful to outside entities or data bases for purposes of coordinating or understanding network or user behavior. Suitable external interface need to be defined for this purpose.

The net result of such a sense-model-control/interact overlay to wireless network is improved user experience and lower operator costs.

Definitions

For the described embodiments, a network end device or end device is generally defined as a device that terminates a wireless link, and could be a Station/STA or terminal (user end)) or access point or base station or relay node (network end). Further, a station/STA is generally defined as an end device that is associated with a user end of link. An access point (AP) is generally defined as an end device associated with network end of the link. A sensor is generally defined as any device that can sense the environment of a wire or a device. The sensor can be active or passive, and can also be a radio, acoustic, optical, IR etc. Further, the sensor can read data off a wire or register. A wireless sensor is generally defined as a sensor that senses the radio environment to listens to signals, analyses the signals or decode/demodulate the signals.

As mentioned, at least some of the described provide systems, methods and apparatuses for sensing, modeling and controlling a wireless network, providing improved user experience and lower operator costs. At least some of the described embodiments improved abilities to understand and solve connectivity problems such as wireless STA being unable to connect or to re-connect with network. Further, at least some of the described embodiments improved abilities to understand, anticipate and solve performance problems such mutual interference, or interference from non-WiFi devices, poor throughput, poor coverage, etc. Further, at least some of the described embodiments involve improved abilities of wireless end devices to support improved or augmented data collection, sensing and reporting functions. Likewise, at least some of the described embodiments also involve end devices that are augmented to improve performance based on accepting additional control inputs.

Further, at least some of the described embodiments provide interactions with external data entities to aid network modeling or knowledge database development.

Further, at least some of the described embodiments include providing data from the knowledge database or sensor outputs to external entities for improved third party data analytics.

FIG. 19 shows a block diagram of a sense, model and control system for improving performance of a wireless network 1910, according to an embodiment.

Wireless Network

The wireless network 1910 may be any type of network using wireless radio transmission in any electromagnetic frequency, spanning global area, wide area, local area and personal area. The wireless network 1910 can be long range to very short range. The wireless network 1910 can serve end users or machines (no human user). The wireless network 1910 can involve any wireless standard from Iridium like LEO satellite communications, mobile networks like 3G and 4G, to WiFi networks to Bluetooth and 802.14 networks.

For at least some embodiments, the wireless network 1910 includes STAs and APs. In one embodiment, the wireless network consists of one or more STAs and one or more APs. In another embodiment, the wireless network consists of two or more wireless stations (STAs). The STAs and the APs may include, for example, the previously described access points 910, 912, and/or the previously described end point devices 922, 924, 926. Further, the STAs and the APs may include, for example, the previously describe motion-controlled devices.

Network Sensors/Internal Data Sources

FIG. 19 shows internal data sources (including network sensors) 1920 that represent the various network sensors that are the sources of monitoring data about the wireless network 1910. The network sensors 1920 sense the state of the wireless network 1910, which can then be used to model and eventually control the wireless network 1910 to improve user experience and lower operator costs. For at least some embodiments, the network sensors 1920 are, for example, the previously described network devices 1180, 1280, 1380. For at least some embodiments, the previously described motion-controlled devices are operational as the network sensors 1920, and/or the network devices 1180, 1280, 1380.

For at least some embodiments, multiple of the depicted network sensors are a single motion-controlled device that is operable to move or locate itself to different points or locations within the wireless network 1910. That is, while shown as multiple network sensors in the described embodiments, the multiple network sensors are actually a single motion-controlled device that is moving to different positions or locations, thereby virtually operating a multiple network sensors. That is, the motion-controlled device (virtually operational as multiple network sensors) can function in any physically feasible position (location universality). Owing to the motion control of the motion-controlled device, the motion-controlled device provides convenience of positioning an opposed to requiring a human being to position the network sensor, thereby providing convenience, and providing safety to the user, and saving costs. For an embodiment, the motion-controlled device is operable to automatically position itself (using, for example, received signal strength) which provides for faster automated positioning versus requiring manual positioning of the network sensor. Further, even if the motion-controlled device is itself statically positioned, the sensors (sensors or antenna) are operable to control their positioning which is useful.

For at least some embodiments, the network sensors 1920 include one or more of multiple sensing modalities, such as wireless sensing covering licensed and unlicensed bands; wired network sensors that listen to traffic on the wired segments or read internal registers inside network elements such as routers, controllers, APs, STAs, switches; cameras or imaging devices in multiple spectrum bands, motion detectors, light detectors. Sensing can also extend to humans-in-loop providing specific data or inputs on network state or fault condition. The list of possible functions of the network sensors 1920 is not limited.

For at least some embodiments, the network sensors 1920 form their own parallel (overlay) network to the primary wireless network 1910.

For at least some embodiments, the network sensors 1920 include wireless probes or sensors that are placed at different points within the wireless network 1910. For one embodiment, at least a portion of the network wireless sensors 1920 are embedded within one or more APs or one of more STAs For another embodiment, at least a portion of the network sensors 1920 are independent of APs or STAs and may be housed in independent boxes.

For at least some embodiments, network sensors 1920 listen on wired connections as data exit or enter components of the wireless network 1910 such as APs, switch, AP controller, AP manager to extract data from their communication behavior.

For at least some embodiments, network sensors include software agents that run on components of the wireless network 1910 such as APs, switch, AP controller, AP manager to extract data from their internal operation.

For at least some embodiments, the network sensors 1920 are configurable. As previously stated, for at least some embodiments, the network sensors 1920 are controllable by service engine 1130.

As stated, for at least some embodiments, the network sensors 1920 sense conditions of the network 1910. Moreover, for at least some embodiments, the network sensors 1920 include receiving manual (man-in-the-loop) inputs from a user device such as, user interface platform 1960 or NOC interface platform 1970.

For at least some embodiments, the network sensors 1920 receive wireless packets transmitted from one wireless device to another wireless node of the wireless network 1910. That is, the network sensors 1920 include a receiver that is operable to receive wireless packets that are intended for reception by the other wireless node of the wireless network. For an embodiment, the network sensors 1920 passively "over hear" the wireless packets. Characteristics of the overheard wireless packets can be used to characterize performance of the wireless network 1910.

For at least some embodiments, the network sensors 1920 include functionality that allows for more optimal network sensor placement using the sensed data.

Further, at least some embodiments include orchestration of data collection to reduce data bandwidth (to, for example, the knowledge database).

Further, at least some embodiments include real time control of data collection and transmission.

Further, at least some embodiments include multiple levels of probes that accommodate trade-offs between cost and function.

Further, at least some embodiments, the network sensors can act as relays for main network.

Further, at least some embodiments include the network sensors are embedded into powered appliances (such as, Light bulbs, USB charging points, coffee pots)

For at least some embodiments, the data collected by the sensors may be sensitive involving security and or privacy concerns. Therefore the data collection, data transmission and data editing/compression must be employ security policies that are in force or agreed upon.

For at least some embodiments, the network sensors are configured based on a demand basis or anomaly basis.

For at least some embodiments, the multiple network sensors are orchestrated to fuse sensed data and improve the quality of the sensed data.

For at least some embodiments, the sensed data of the multiple network sensors is compressed to reduce bandwidth needed to transmit such data to the sensor service engine and knowledge database.

Service Engines

For at least some embodiments, service engine 1930 refers to a collection of different engines, one each for a specific function. The list of service engines provided is only representative and not limited. For an embodiment, the service engine 1930 includes the service engines 950 and the analytics engine 952.

Sensor Service Engine

For at least some embodiments, the sensor service engine of the service engines 1930 receives data from internal data sources, and for at least some embodiments, provides at least some control over the internal data sources (1920). Further, for at least some embodiments, the sensor service engines both update and store wireless network information in a knowledge database 1940, and as well as accesses previously stored wireless network information to determine what additional sensing is needed or how sensors should be configured.

Further, for at least some embodiments, the sensor service engine process data received from the network sensors 1920.

At least some embodiments include sensor service engines that control data collection, compression, orchestration, configuration of sensors guided by the knowledge database 1940, for example status and anomaly detects reported by an anomaly service engine.

External Service Engine

For an embodiment, an external service engine of the service engines 1930 interacts with external databases 1950 to send data from knowledge database 1940 or from internal data sources 1920. Further, the external service engine fetches data on as needed basis from external data bases and sends them to knowledge database/network modeling entity.

User Service Engine

For an embodiment, a user service engine of the service engines 1930 interacts with the end user with an end device (user interface platform) 1960, and for at least some embodiments, the user service engine interacts with a user via application interfaces running on the user device (user interface platform) 1960. Further, for at least some embodiments, the user service engine provides information to the user device (user interface platform) 1960, and additionally receives information from the user device (user interface platform) 1960. For an embodiment, the user device 1960 is the previously described end point device 920.

Network Operations Center (NOC) Service Engine

For an embodiment, an NOC service engine of the service engines 1930 interacts with the NOC interface platform 1970 that is used by operators to monitor the condition of the wireless network 1900. Further, for at least some embodiments, the NOC service engine interacts with a NOC staff via application interfaces such as dashboards running on the NOC servers. Further, for at least some embodiments, for at least some embodiments, the NOC service engine provides information to the NOC interface platform 1970 and additionally receives information from the NOC interface platform 1970. For an embodiment, the NOC interface platform 1970 is the previously described network device 1380.

Control Service Engine

For an embodiment, a control service engine of the service engines 1930 interacts with the network 1910 and the end devices such as APs and STAs as well as controllers and routers to change settings on these devices. For an embodiment, the control service engine is guided by an inference service engine which determines how network settings should be altered.

Anomaly Service Engine

For an embodiment, an anomaly service engine of the service engines 1930 interacts with the other service engines and the knowledge database 1940 to detect network anomalies. The anomaly detection is used by other service engines to take specific actions that result in final diagnosis and solution of the anomaly.

Inference Service Engine

For an embodiment, an inference service engine of the service engines 1930 is triggered by the anomaly detection and it uses the data form the knowledge database and other information from user interface platform 1960, NOC interface platform 1970 and sensor data 1920 to diagnose the network problem as well as find a solution to the anomaly. Solutions may be in terms of recommendations to the user interface platform interface 1960 or NOC interface platform 1970 or direct control of parameters of the network via the control service engine.

Network Models/Knowledge Database

For at least some embodiments, the Network model/knowledge database 1940 includes a repository of all knowledge needed to provide services. For at least some embodiments, the knowledge database 1940 includes different information segments each of which is relevant only to a single wireless network 1910. For at least some embodiments, the knowledge database 1940 contains information segments that are globally relevant and is shared across multiple wireless networks.

For at least some embodiments, the knowledge database 1940 is operable with different formats. Such formats include, for example, relational databases, network, lists, association rules, graphical models, neural networks, decision trees, or probabilistic models.

For at least some embodiments, the knowledge database 1940 includes dynamic (real-time) and/or persistent (historical) data.

For at least some embodiments, the knowledge database 1940 includes different knowledge representations that are unique to WiFi or other specific networks.

For at least some embodiments, the knowledge database 1940 includes black lists and white lists.

For at least some embodiments, the knowledge database 1940 includes geographic (map) representation of data—STA location, inter device interference, Non-WiFi interference maps.

For at least some embodiments, the knowledge database 1940 includes information that is global. That is information obtained from one wireless network is utilized at one or more different wireless networks.

For at least some embodiments, the knowledge database 1940 is integrated with other entities. The other entities include, for example, calendar/event data base, STA location from GPS, home security database (for example, information on whether a user is in or out of house or office).

External Databases

For at least some embodiments, the external databases 1950 include data inputs from third parties. The data input include, for example, end point characteristics, floor plans, AP location, firmware status of STA and APs or routers.

For at least some embodiments, the external databases 1950 are interactive, and include, for example, a query response. For an embodiment, the query response includes sending captured network packets and receiving a classification result as to what application the packets belong to (Netflix, Skype, etc.).

For at least some embodiments, the external databases 1950 include data outputs for third analytics, and include co-ordination with other networks to jointly improve user experience and lower operator costs.

For at least some embodiments, the external databases 1950 is connectable with other entities—calendar/event data base, home security data bases (for example, information on whether a user is in or out of house or office), visit patterns, visit locations.

For at least some embodiments, the external databases 1950 are connectable with external service entities like—what applications is this user using (packet inspection), what are known problems about this device (from MAC address).

User Interface Platform

For an embodiment, the user interface platform 1960 includes a user device wherein an application is running on the user device. For at least some embodiments, the user interface platform 1960 is utilized for improving the performance of the wireless network. For an alternate embodiment, the user interface platform 1960 includes an application running on a separate device, including, for example, a web server, or a network sensor with built-in UI.

For an embodiment, the user interface platform 1960 is utilized as a "man in the loop". Essentially, a human operator (user) of the user device is utilized to monitor, interact and correct network problems. As stated, the user interface 1960 can include the user device (STA), a client and/or an application running on the user device, and/or an application running on a separate device.

For at least some embodiments, the user interface platform 1960 monitors the status of the wireless network and raises alerts to the user service engines 1930.

For at least some embodiments, the user interface platform 1960 changes network settings.

For at least some embodiments, the user interface platform 1960 interacts with service engines 1930 to localize problems.

Network Operations Center (NOC) Interface Platform

For an embodiment, the NOC interface platform 1970 includes an operator that interacts with the NOC services engine to provide the NOC operator with diagnostic information and suggestions for interventions in the network.

For an embodiment, the NOC services engine interacts with the NOC interface platform 1970 through the use of alerts, messages, application interfaces.

At least some embodiments allow the operator to observe status of the multiple wireless networks. Further, for at least some embodiments, the operator at the NOC interface platform 1970 is able to control settings or configurations of the wireless network 1910.

For at least some embodiments, the NOC interface platform 1970 includes displaying, monitoring, interacting and correcting network problems. For an embodiment, the operator (a human) is included within the control loop for solving problems associated with the wireless network 1910.

Figure 20:
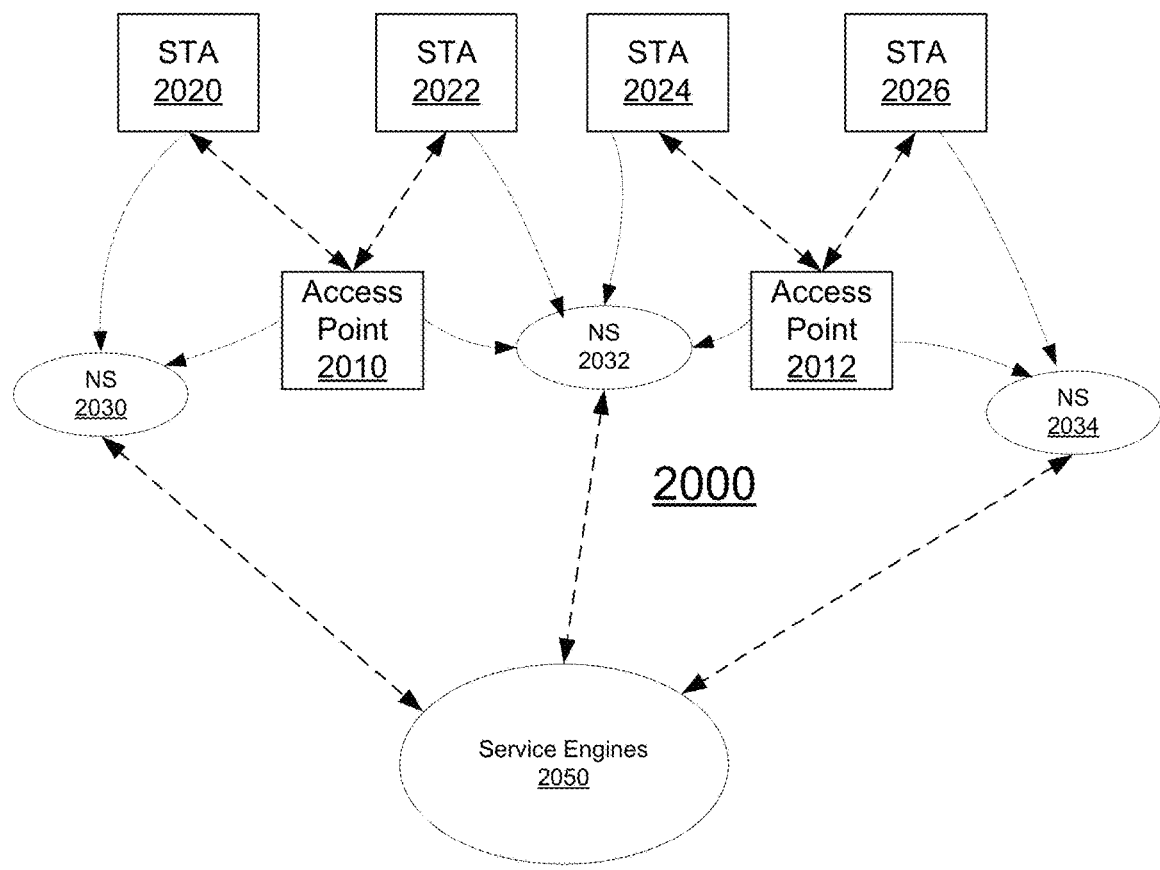
FIG. 20 shows a wireless network that includes multiple wireless sensors, according to an embodiment.

FIG. 20 shows a wireless network 2000 that includes multiple network sensor devices, according to an embodiment. The wireless network 2000 includes multiple wireless network nodes including access points 2010, 2012 (which could be previously described access points 910, 912) and stations (STA) 2020, 2022, 2024, 2026 (which could be previously described end point devices 920, 922, 924, 926). Further, network sensors 2030, 2032, 2034 (which could be the previously described network devices 1180, 1280, 1380) overlay the wireless network 2000.

The network sensors 2030, 2032, 2034 are operative to sample the state or conditions of the wireless network 2000. While only three network sensors are shown in FIG. 20, it is to be understood that a large number of network sensors may be utilized. Further, with a large number of network sensor continuously sampling conditions of the wireless network 2000, the amount of sample data collected can be substantial. Accordingly, the disclosed embodiments provide for subsampling of the collected data to reduce system requirements, such as, backhaul requirements needed to support the network sensors. For an embodiment, the subsampling maintains only a predetermined percentage of the packets. For an embodiment, the predetermined percentage is 10%.

For an embodiment, the network sensors 2030, 2032, 2034 receive packets transmitted from one wireless device, and intended for another wireless device. That is, for an embodiment, the network sensors 2030, 2032, 2034 form a second network that overlays the wireless network 2000. For example, network sensor 2030 may be physically placed within the wireless network 2000 so that the network sensor 2030 is able to receive packets being transmitted between a user device 2020 and an access point 2010. Further, the network sensor 2032 may be physically placed within the wireless network 2000 that the network sensor 2032 is able to receive packets being transmitted between a user device 2022 and the access point 2010. Network sensor 2032 may similarly receive wireless signals from the user device 2024 and the access point 2012, and network sensor 2034 may receive wireless signals from the user device 2026 and the access point 2012.

As wireless communication between the wireless devices of the wireless network 2000 typically includes large numbers of packets, for at least some embodiments, the network sensor 2030 intelligently determines which of the received packets to retransmit (either wired or wirelessly) to a service engine 2050. Further, in at least some embodiments, the wireless network sensor transmits only a descriptor of the received packet to further reduce backhaul usage. For at least some embodiments, the wireless network sensor transmits a representation of the received packet. For at least some embodiments, the service engine 2050 utilizes the packets, the descriptors of the packets, or the representations of the packets to identify conditions or anomalies of the wireless network for improving user experience and lower operator cost of the wireless network.

Figure 21:
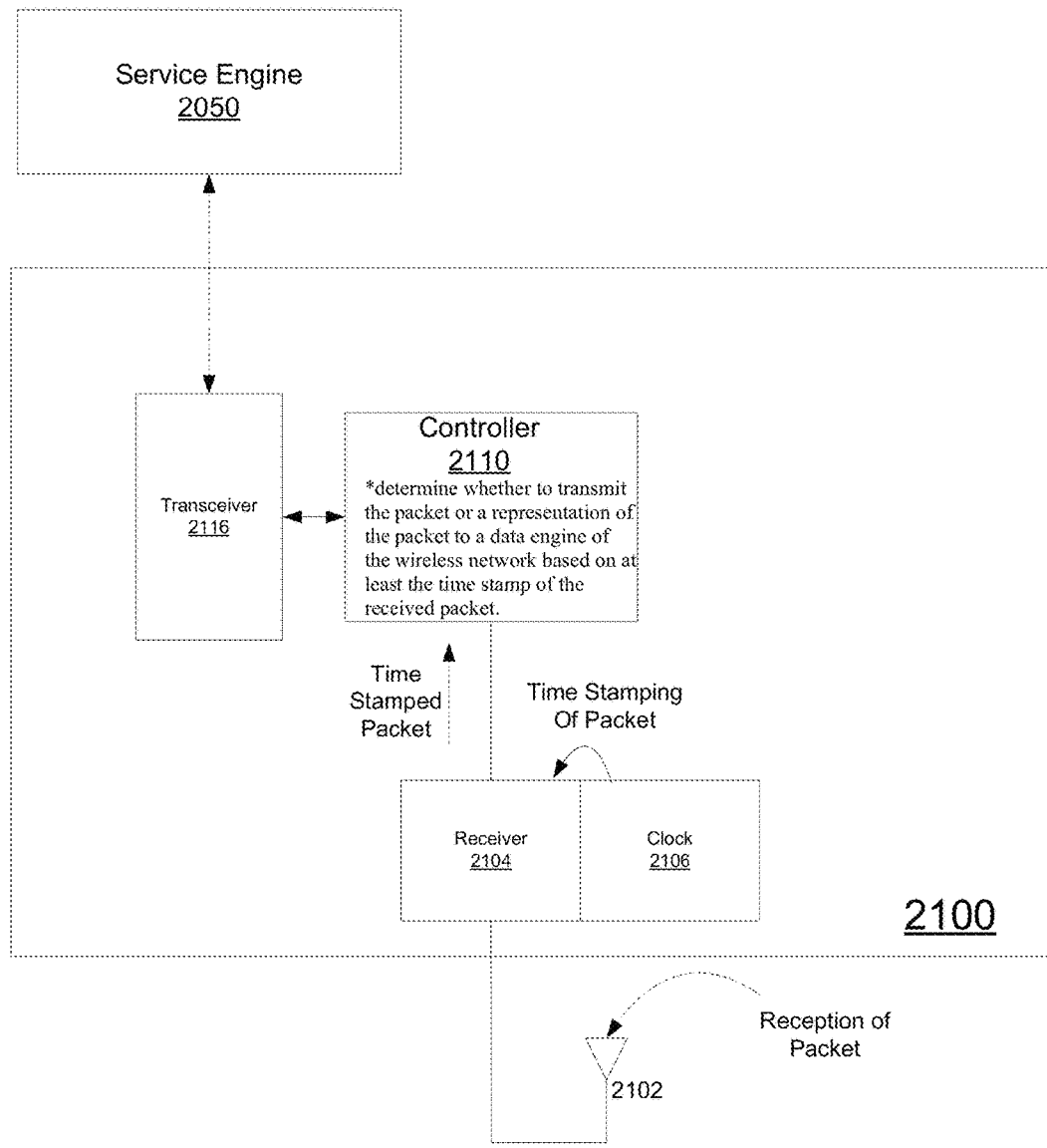
FIG. 21 shows a wireless sensor, according to an embodiment.

FIG. 21 shows a network sensor 2100 (which could be the previously describe network devices 1180, 1280, 1380, or the previously described motion-controlled devices (without the motion control being shown), according to an embodiment. For an embodiment, the network sensor 2100 includes an antenna 2102 and a receiver 2104 for receiving wirelessly transmitted packets. The network sensor 2100 includes a clock 2106 which is used to time-stamp packets as the packets are received by the receiver 2104. For an embodiment, the timestamp is based on the internal clock 2106 of the network sensor.

A controller 2110 of the network sensor 2100 determines if the received packets that have been time-stamped, are to be transmitted by the network sensor 2100 to the service engine 2050. It is to be understood that transmitting the packets to the service engine 2050 includes transmitting at least a representation of the packets. For example, for various embodiments, the representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets. Various parameters can be used to make the determination. Essentially, the network sensor 2100 functions as a gate for determining which of received packets or representation of the packets are further transmitted to the service engine 2050 through, for example, transceiver 2116. The gating provides for orchestration between multiple of similar network sensors. The coordination results in subsampling of the packets, which reduces the impact of the packets on, for example, a backhaul of the network sensors.

For an embodiment, algorithms operating on the controller 2110 within the network sensor attempt to synchronize the internal clock 2106 to internal clocks of other network sensors. For an embodiment, time stamp rules are received by the network sensor 2100 from one or more external devices.

For an embodiment, the time-stamp of a packet is used to aid in the determination of whether to transmit the packet to the service engine 2050.

For an embodiment, an absolute timestamp is determined on real-time clock hardware in the network sensor. For at least some embodiments, algorithms are operable within the network sensor that keeps these timestamps (roughly) synchronized between different sensors. For an embodiment, the rule that is applied to the timestamp is programmed into the sensor by service engine 2150.

For an embodiment, a packet header or packet content of the packet is additionally or alternatively used in the determination of whether to transmit the packet to the service engine 2050.

For an embodiment, an internal state of the network sensor is additionally or alternatively used in the determination of whether to transmit the packet to the service engine 2050. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (for example, packet rates, data rates) over one or more past observation windows.

As stated, the network sensor 2100 selectively transmits packet to the service engine 2050. However, for at least some embodiments, the network server 2100 also receives information from the service engine 2050. The information received from the service engine 2050 can include, for example, rules and control messages. The rules can influence whether a packet is transmitted to the service engine 2050. The control messages can provide control of the network sensor 2100, including, for example, selecting one or more wireless channels for receiver 2104, the receiver bandwidth, selecting the type of data to be recorded, resetting the clock 2114.

Figure 22:
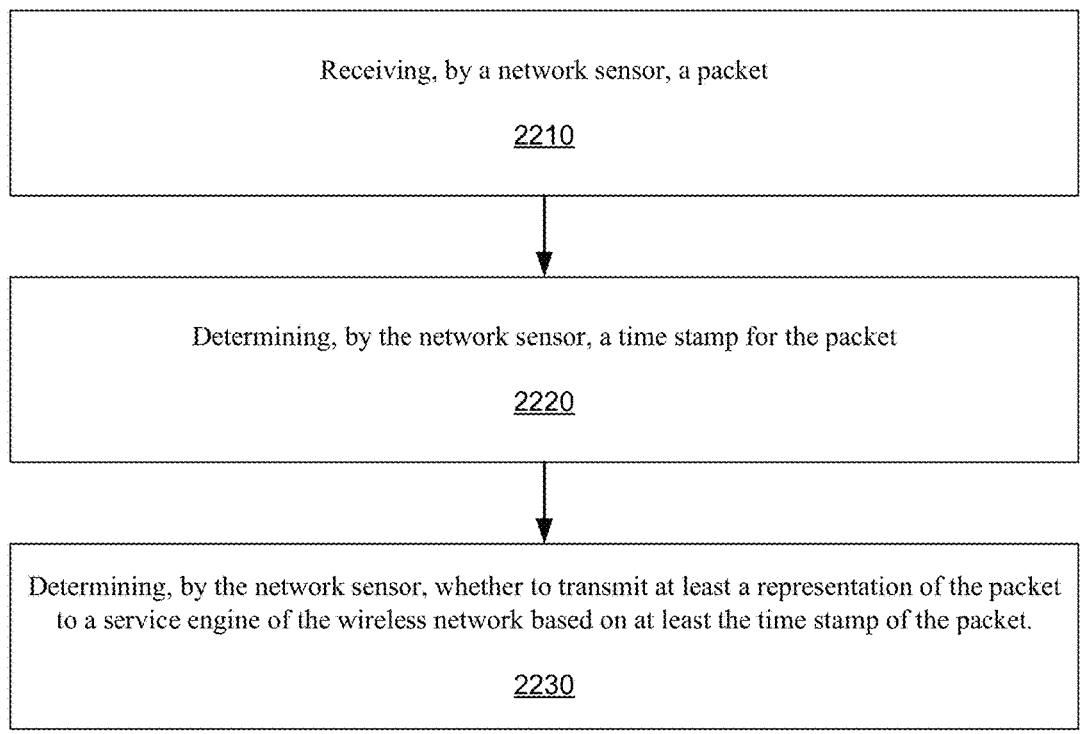
FIG. 22 is a flow chart that includes steps of a method of operating a wireless sensor, according to an embodiment.

FIG. 22 is a flow chart that includes steps of a method of sensing conditions of a wireless network, according to an embodiment. A first step 2210 includes receiving, by a network sensor, a packet. A second step 2220 includes determining, by the network sensor, a time stamp for the packet. A third step 2230 includes determining, by the network sensor, whether to transmit at least a representation of the packet to a service engine of the wireless network based on at least the time stamp of the packet. The network sensors transmits the at least the representation of the packet after determining to transmit the at least the representation of the packet.

For at least some embodiments, the at least a representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets, wherein the representation of multiple packets includes representation of the present packet and representation of other packets.

For at least some embodiments, the packet is a data packet, a management packet, or a control packet.

For at least some embodiments, determining whether to transmit the at least the representation of the packet is additionally or alternatively based on at least one of a packet header or packet content. For at least some embodiments, the packet header information includes one or more of transmit addresses, a destination addresses, packet data rate, packet priority, packet type (management, control, data), packet flags, a packet size, and/or other packet meta information. Further, for at least some embodiments, the packet content information include one or more of transmit and destination IP addresses, higher protocol content (for example, DHCP messages, ARP messages), control message in application-level protocols. For example, flow control messages of the control message may precede data rate changes (for example, Netflix resolution changes, Skype adding another caller etc.). For encrypted packet content, at least some embodiments include the packet content information being surrogated by payload length, or sequencing information.

For at least some embodiments, determining whether to transmit the at least the representation of the packet is additionally or alternatively based on an internal state of the network sensor. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (packet rates, data rates) over one or more past observation windows. For an embodiment, the internal state includes probabilistic data structures that reduce a memory footprint at the cost of slightly reduced decision accuracy (for example, approximate membership tests, such as Bloom filters, quotient filters).

For at least some embodiments, determining whether to transmit the at least the representation of the packet is additionally or alternatively based on an external state of the network sensor, wherein the external state comprises non-wireless observations of the sensor or non-wireless events. This includes, for example, presence detection and/or motion detection (that is, determining whether there are people in the room). For an embodiment, the sensed conditions do not relate to the wireless aspect of the wireless network. For an embodiment, the external state includes sensing non-wireless observations of the network sensor, such as non-wireless events. For an embodiment, this includes additional sensing modalities (motion sensor, temperature sensor, etc.). For an embodiment, the external state includes receiving instruction from a user or operator.

For at least some embodiments, determining whether to transmit the at least the representation of the packet is additionally based on an internal state of the network sensor, and based on at least one of a packet header or packet content.

For at least some embodiments, determining whether to transmit the at least the representation of the packet is additionally based on a decision rule received by the sensor from an external device. That is, the decision or the decision rule is provided to the network sensor from an external source. For example, the service engine provides the decision based on event detection. For example, for an embodiment, the service engine observes and event on at least one of a plurality of sensors, and once observed, the service engine changes the decision rule on another sensors to "zoom in" on this event in more detail. For an embodiment, zooming in includes modifying the decision rule in a way that transmits a larger number of packets or representations of packets.

For at least some embodiments, determining whether to transmit the at least the representation of the packet is additionally based on an at least pseudo randomization rule that results in at least pseudo random transmission of a plurality of packets by the network sensor. For an embodiment, the transmission of the plurality is random. The transmission of the at least the representation of the packet is based on the pseudo randomization rule in that the rule that uses above inputs (timestamp, packet header, packet content, internal state, external state) to make determination of whether to transmit the at least the representation of the packet or not. For at least some embodiments, the at least pseudo randomization rule includes a seed, wherein the seed is received from an external device (for example, service engine).

As previously stated, for an embodiment, the subsampling maintains only a predetermined percentage of the packets. For an embodiment, the predetermined percentage is 10%.

For at least some embodiments, to transmit the at least the representation of the packet is additionally based on a periodic rule that results in periodic transmission of a plurality of packets by the network sensor.

As shown and described, the network sensor is typically used as one of many network sensor of the wireless network. Further, for at least some embodiments, the generation of packets or representations of packets amongst the network sensors is coordinated. That is, for at least some embodiments, each of the plurality of coordination sensors receive a corresponding packet, determine a corresponding time stamp for the corresponding packet, and determine whether to transmit at least a representation of the corresponding packet to the service engine of the wireless network based on at least the time stamp of the received corresponding packet. For an embodiment, corresponding packets mean observations of the same transmitted packet received by different network sensors. The observations can potentially be differently corrupted by the wireless channel. In this embodiment, the plurality of network sensors provides diversity for receiving the same packet.

For at least some embodiments, the plurality of coordinated network sensors are coordinated in their transmission of the at least a representation of the corresponding packet due to the described processes (embodiments) of receiving joint or shared or common, rules, commands, seeds, time synchronization.

For at least some embodiments, the coordination includes each of the multiple network sensors deriving their local timestamps from a common source (for example, the service engine), receiving their rules from common source, or receiving parts of the input for rule from common source (for example, the seed of the pseudorandom function). For at least some embodiments, if the decision rule is purely based on receive timestamp and packet header or content, and the timestamps between each of the plurality of sensors are synchronized, all of the plurality of sensors will make the same decisions on whether to transmit the at least the representation of the packet.

For at least some embodiments, the plurality of coordination network sensors is adaptively selected. For an embodiment, the plurality of coordinated network sensors are adaptively selected based on proximity of the network sensors. For an embodiment, the plurality of network sensor is selected based on an ability of the network sensors to wirelessly communicate with each other. For at least some embodiments, the plurality of network sensors is selected bases on a logical grouping, a tenant, an SSID, and/or a communications channel band.

For an embodiment, determining whether to transmit the at least the representation of the packet includes determining a function of a quantized time of the time stamp, the packet content, and a seed that generates random sampling. When the network sensor is one of many network sensor that are all randomizing (or pseudo random) their packet transmission according to the same rule, the upstream device (such as, the services engine) receives the representation of the packets from the many network sensors. Each packet is either received from all or a subset of the plurality of sensors, or from none at all. For a more specific embodiment, determining whether to transmit the at least the representation of the packet includes determining whether a hash function applied to quantized time of the time stamp, the packet content, and the seed modulo n results in a number no larger than m, wherein the quantized time of the time stamp represents a rounded version of the timestamp, the seed is a pre-agreed number (for example generated from a service engine) amongst a plurality of sensor, and wherein n and m are preselected integers.

The quantized time of the time stamp exists because the timestamp synchronization error between sensors is not below a threshold. For at least some embodiments, a quantization level is chosen given the quality of time synchronization or a threshold error between the plurality of sensors.

For at least some embodiments, the seed, and the integers n and m are chosen by an external device, located, for example, in the cloud (for example a service engine). The integers n and m determine the amount of data reduction (sampling rate). Their values individually do not matter, but together they determine the subsampling rate as their ratio m/n.

For at least some embodiments, determining whether to transmit the at least the representation of the packet is additionally based on a confidence interval of time synchronization between the plurality of coordinated network sensors. For at least some embodiments, multiple network sensors receive a common time synchronization signal from a common source (for example, from a services engine), but due to network delays the synchronization is only to a certain accuracy of +-delta. For an embodiment, the confidence interval is the maximum value that delta can take on.

For an embodiment, determining whether to transmit the at least the representation of the packet includes determining whether a hash function applied to quantized time of the time stamp minus (or plus) the confidence interval, the packet content, and the seed modulo n results in a number no larger than m, and/or whether a hash function applied to quantized time of the time stamp plus the confidence interval, the packet content, and the seed modulo n results in a number no larger than m, wherein the quantized time of the time stamp represents a rounded version of the timestamp, the confidence interval is an upper bound on the time synchronization error, the seed is a pre-agreed number amongst a plurality of sensor (for example received from a service engine), and wherein n and m are preselected integers.

For this embodiment, for a plurality of network sensors, packets transmitted by the plurality of sensors are subsampled at a rate higher than m/n. If the timestamps of the plurality of sensors are synchronized to within plus or minus delta time between all the plurality of sensors, all of the plurality of sensors will make the same decisions on whether to transmit the at least the representation of the packet.

For at least some embodiments, the internal state of the network sensor and/or determining whether to transmit the at least the representation of the packet includes determining whether (a) a transmitter address of the packet is different than any transmitter address of any other packet evaluated or received within a last T1 seconds, or (b) the transmitter address of the packet matches a transmitter address of another packet that satisfied (a), within the last T2 seconds.

As previously shown (FIG. 19) and described, at least some embodiments includes a plurality of the described network sensors placed proximate to the wireless network, wherein a service engine receives a plurality of packets from the plurality of network sensors. Further, as described, the service engine(s) identify conditions of the wireless network based on the received plurality of packets. Such conditions include, but are not limited to, network events, network alerts, network anomalies, network performance problems, and/or protocol deadlocks.

FIG. 23 is a flow chart that includes steps of method of estimating qualities of links between devices of a wireless network, according to an embodiment. A first step 2310 includes obtaining, by a service engine, a plurality of link quality signatures, wherein each of the plurality of link quality signatures includes link qualities between a network node and a plurality of network sensors. A second step 2320 includes estimating, by the service engine, link qualities between a plurality of network nodes based on the plurality of link quality signatures and a estimation model.

As previously described, for an embodiment, the plurality of network sensors form an overlay network that overlays an existing wireless network that includes at least the plurality of network nodes. For at least some embodiments, the nodes of the existing wireless network provide limited RF information and/or feedback to service engine or to their own access network. The described embodiments provide augmenting information about these nodes to the wireless network 1910. For at least some embodiments, these nodes provide limited RF information to their own access network and overlay network extracts additional information which can be provided to the wireless network 1910.

For at least some embodiments, the link qualities of the signatures include at least one of RSSI, path loss, MIMO (multiple input, multiple output channel) order, capacity, and/or interference information. For at least some embodiments, the link qualities between a plurality of network nodes includes at least one of RSSI, path loss, MIMO order, modulation schemes, coding schemes, propagation characteristics (LOS, NLOS), capacity, interference information. For an embodiment, the plurality of network nodes includes two network nodes. That is, link qualities are estimated between a pair of nodes based on the plurality of link quality signatures and the estimation model.

At least some embodiments include generating a coverage map by computing (estimating) the link qualities for each Access point and a plurality of access nodes in the coverage map. At least some embodiments include building a graph/map that represents the wireless network by repeating the estimation of link qualities between pluralities of network nodes among many network nodes or locations of the wireless network. For example, the link qualities can be estimated for pairs of nodes within the wireless network. The estimated link qualities can be presented as a graph or map which depicts the link qualities between each of the nodes of the wireless network.

For at least some embodiments, the network service engine obtains a stream of pluralities of link quality signatures. This is, for an embodiment, a continual flow (stream) of link quality signatures are generated over time. For an embodiment, a continual flow (stream) of link quality signatures is generated over space. For an embodiment, a continual flow (stream) of link quality signatures is generated over time and space. For an embodiment, the continual flow (stream) of link quality signatures is received by the service engine. At least some embodiments include averaging multiple of the stream of pluralities of link quality signatures. For an embodiment, the averaging is performed at the network service engine. For an embodiment, the averaging is performed by the network sensors before being received by the service engine. That is, the service engine received a stream of link quality signatures that have been averaged over time.

For at least some embodiments, each signature is based on a single packet received by the plurality of network sensors from the single network node. That is, the single packet was transmitted by the single network node, and received by the plurality of network sensors.

For at least some embodiments, obtaining the plurality of link quality signatures includes receiving a packet descriptor from each of a plurality of network sensors, and comparing the packet descriptors to determine which packets were commonly received from the single network node by multiple of the network sensors. For at least some embodiments, the packet descriptor includes a packet transmitter address. For at least some embodiments, the packet descriptor includes a timestamp of when the packet was received by a network sensor of the plurality of network sensors.

At least some embodiments include determining the estimation model. For an embodiment, this includes characterizing wireless propagation with physical equations. For an embodiment, the determining the estimation model includes characterizing wireless propagation based on training measurements of link quality signatures from a second plurality of network sensors and corresponding training measurements of link quality from a second plurality of network nodes. For an embodiment, the second plurality of network sensors and/or network nodes is used for training the estimation model. In an embodiment the prior measurements are designed such that they cover possible relative locations of network sensors and/or network nodes. In another embodiment, the second plurality of network sensors is identical to the plurality of network sensors being utilized in link quality estimation based on the estimation model.

For an embodiment, the determining the estimation model includes determining the estimation model comprising characterizing wireless propagation with physical equations and characterizing wireless propagation based on prior measurements of link quality signatures and corresponding link quality between nodes. For at least some embodiments, determining the estimation model includes assigning different weights to different cases of the training measurements. For an embodiment, the weights are determined based on a function of the measured link quality between nodes. For example, during construction of the estimation model, cases in which the link quality is low are given additional weighting. Specifically, for example, an objective function used in model optimization is chosen such that errors at low link qualities are penalized more than errors at high link quality. For example, link quality estimation is used to monitor rate control algorithms. The critical cases for these algorithms are when the link quality is below a threshold, hence these cases are weighted more. For an embodiment, the training data is measured in a geometric. For an embodiment, the weights are used to rebalance the training data in order to match it better to the application case, thus (partially) compensating the mismatch.

At least some embodiments include determining the estimation model by modeling network sensor operation before deployment of the network sensors.

For at least some embodiments, an estimation model is precomputed for each of a plurality of different scenarios (for example, office, campus, residential, etc.), and one of the estimation models is selected for each actual deployment. Further, for an embodiment, the estimation model is based on physical equations of wireless propagation. During deployment of the network sensors, the sensor locations are recorded. These sensor locations can be used to determine the sensor distances, which together with the physical equations, can be used to determine the model.

For at least some embodiments, determining the estimation model includes modeling network sensor operation after deployment of the network sensors. Further, for at least some embodiments, the estimation model is initialized before deployment, and adapted to the deployment site based on a set of measurements performed by the plurality of network sensors. Further, for at least some embodiments, the estimation model continually adapts to additional measurements that become available while deployed.

For at least some embodiments, estimating the link qualities between the plurality of network nodes is further based on link quality signatures between the plurality network sensors. For an embodiment, the link quality signatures between the plurality of network sensors is further based on a subset of the plurality of network sensors transmitting packets and other network sensors of the plurality of network sensors receiving and estimating a link quality between the plurality of network sensors. Specifically, for an embodiment, this includes the network sensors determining link strengths between each other by transmitting sounding packets, and supplementing the estimation model with the link strengths determined between the network sensors.

As will be described, for at least some embodiments a processing engine uses sensor-to-sensor link strengths as additional model inputs. That is, along with the plurality of link quality signatures between a network node and a plurality of network sensors, the sensor-to-sensor link strengths are as additional model inputs into the network estimation model.

For an embodiment, the sounding packets are constructed in a way as not to interfere with regular operation of wireless network. For example, for an embodiment, the sounding packets are only transmitted and utilized during periods of low-use of the wireless network, such as at night when a business that utilizes the wireless network is not very active, or active below a threshold level. For an embodiment, the sounding packets are transmitted when activity of the wireless network is sensed to be low or below a threshold. By only transmitting and utilizing the sounding packets during low-use times, the impact of the sounding packets on the network can be minimized.

For at least some embodiments, the link quality signatures between the network sensors are determined upon sensing a motion of one or more of the network nodes of greater than a threshold.

For at least some embodiments, the link quality signatures between the network sensors are determined periodically, wherein periodically could be regularly or within a max period of elapsed time or within a time interval.

At least some embodiments further includes preprocessing each of the plurality of link quality signatures before estimating the link qualities, and estimating the link qualities between the pair of network nodes based on the plurality of preprocessed link quality signatures and the network estimation model. For at least some embodiments, the estimation model is based on one or more of a node type, a node capability, a node transmission power level, a node receiver sensitivity, a node receiver gain, a modulation/coding scheme, or a number of active transmitters.

For at least some embodiments, preprocessing each of the link qualities of each signature of each network sensor includes determining a ratio of the link quality between the network sensor and the network node and a link quality between a selected network sensor and the network node, thereby accounting for variations in transmit power of the network node over time.

Figure 24:
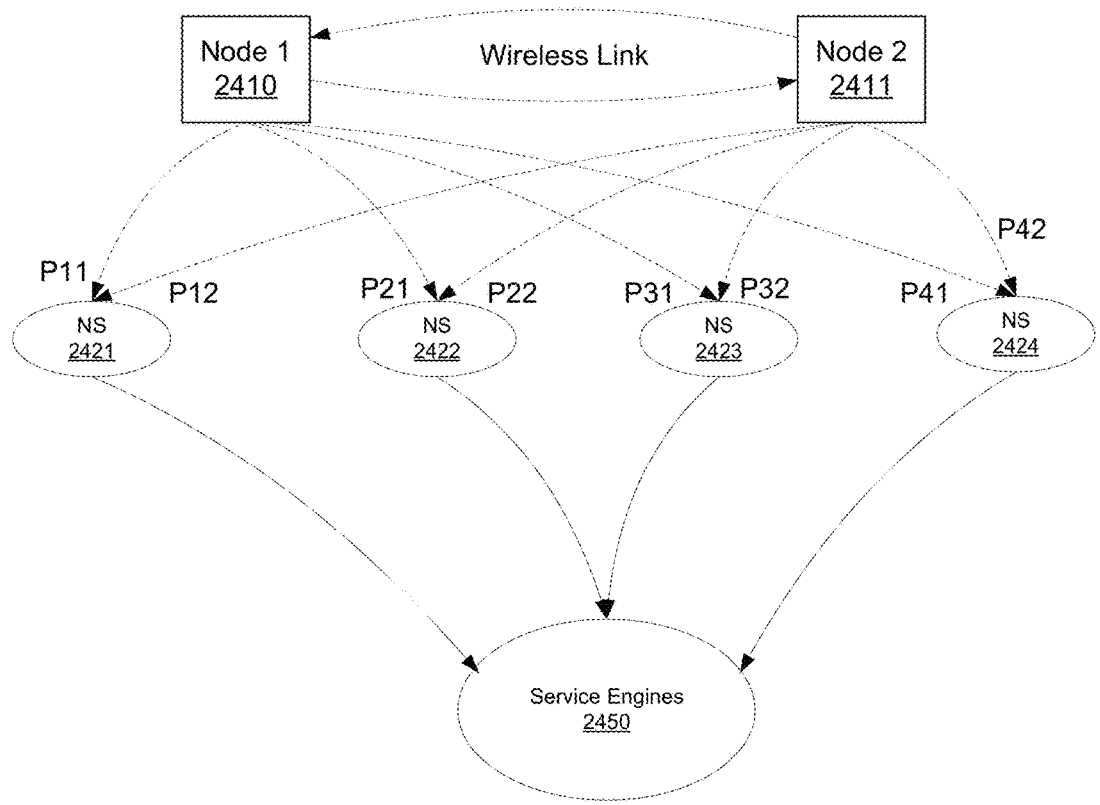
FIG. 24 shows a pair of wireless end devices and wireless sensors, according to an embodiment.

FIG. 24 shows a pair of network nodes 2410, 2411 and network sensors 2421, 2422, 2423, 2424 (for example, the previously described network devices 1180, 1280), according to an embodiment. The network nodes 2410, 2411 represent two nodes of a wireless network that are communicating with each other. The network sensors 2421, 2422, 2423, 2424 are operable to "overhear" the wireless communication between the network nodes 2410, 2420. Based on the overheard wireless communication, the quality of the wireless link between the wireless access nodes 2410, 2420 is estimated. As previously described, for an embodiment, one or more of the network sensor is included within one of the previously described motion-controlled devices.

For an embodiment, a services engine 2450 receives representations of the wireless signals received by each of the wireless network sensors 2421, 2422, 2423, 2424. As described, for an embodiment, the network service engine 2450 is operable to obtain a plurality of link quality signatures, wherein each signature includes link qualities between a network node (such as, wireless node 2410 or wireless node 2411) and a plurality of network sensors (such as, wireless network sensors 2421, 2422, 2423, 2424), and estimate link qualities between the pair of network nodes (2410, 2411) based on the plurality of link quality signatures and a network estimation model.

Exemplary Steps for Constructing the Estimation Model

For at least some embodiments, the use of the estimation model begins with:

Selecting a Parameterizable model, namely a function $y_{est} = f(x_1, x_2, x_3, \ldots, x_p, c_1, c_2, c_3, \ldots, c_k)$, where f is the estimator function, and $y_{est}$ is the output of the estimator.

For at least some of the embodiments described, the estimated link quality ($y_{est}$) is, for example, between node 1610 and node 1611, and $x_1, x_2, x_3, \ldots, x_p$ are predictor variables (the inputs of the estimator). For at least some of the embodiments described, $x_1, x_2, x_3, \ldots, x_p$ are the link quality signatures for node 2410 and node 2411 (each consisting of link quality numbers as observed by sensors 2421, 2422, 2423, 2424). In other words, p=8 numbers.

For at least some of the described embodiments, these inputs additionally include pairwise link quality signatures between sensors 2421, 2422, 2423, 2424. In other words, an additional 6 numbers for a total of p=14.

Further, $c_1, c_2, c_3, \ldots, c_k$ are parameters of the estimator. For at least some embodiments, the values of these parameters are learned during a training phase.

A training dataset, namely n examples of the form $(y^{(i)}, x_1^{(i)}, x_2^{(i)}, x_3^{(i)}, \ldots, x_p^{(i)})$ for i=1 to n, where $y^{(i)}$ is the link quality between nodes 2410 and 2411 for the ith training example $x_1^{(i)}, x_2^{(i)}, x_3^{(i)}, \ldots, x_p^{(i)}$ are the values of the predictor variables for the ith training example.

Estimation Model Construction (Training):

For at least some embodiments, training of the estimation model includes:

1. First, the parameters of the estimator are initialized, using one of

Set $c_1, c_2, c_3, \ldots, c_k$ to random numbers in a predefined range, or

Set $c_1, c_2, c_3, \ldots, c_k$ to predefined fixed numbers, or

Set $c_1, c_2, c_3, \ldots, c_k$ to numbers derived from the training data set with a predefined computation rule, or Set $c_1, c_2, c_3, \ldots, c_k$ to numbers derived from a physical equations of wireless signal propagation.

2. Next, for j in 1, 2, 3, . . . .

For i in 1, 2, 3, . . . , n, consider example i from the training dataset

Compute estimate $y_{est}^{(i)} = f(x_1^{(i)}, x_2^{(i)}, x_3^{(i)}, \ldots, x_p^{(i)}, c_1, c_2, c_3, \ldots, c_k)$ based on the current parameters of the estimator Compute the current estimation error $e^{(i)} = y^{(i)} - y_{est}^{(i)}$ Based on a predefined rule that depends on the estimate $y_{est}^{(i)}$, the true value $y^{(i)}$, and the current parameters of the estimator $c_1, c_2, c_3, \ldots, c_k$, compute new parameters of the estimator (to reduce the estimation error of the current example)

3. Stop the loop over j in step 2 based on one or more of the following stopping criteria Estimation error $e^{(i)}$, averaged over all n examples in the training set, did not change significantly as compared to the previous run of the loop (previous value of j)

Parameters of the estimator $c_1, c_2, c_3, c_k$ did not change significantly as compared to the previous run of the loop (previous value of j)

4. Store the final values of the parameters of the estimator $c_1, c_2, c_3, \ldots c_k$. They specify the estimation model.

At least some embodiments include variations on the method above:
  weighting the training set:
    Assign a weight to each example in the training dataset. In the method above, the implicit weight for the ith example is the equal weight $w_i=1/n$. More generally, the weight can be computed based on the true link quality $y^{(i)}$, the predictor values $x_1^{(i)}$, $x_2^{(i)}$, $x_3^{(i)}$, ..., $x_p^{(i)}$, or on a combination of the two
    Instead of visiting all examples i=1, ..., n in equal proportion (in the inner loop of step 2), visit each example at a frequency proportional to its weight
  in each loop over j, use a random subset of the training dataset instead of the entire dataset (to save computation)
  construct multiple estimation models (with different random starting conditions, or different random subsets of the training set, or different parameterizable estimator function f), and combine the estimates with a combining function
  ... (there are a lot of variations: online learning, cross-validation, ... )
Some exemplary specific examples of parameterizable models f:
  Neural networks
  Support vector regression
  Generalized linear models
  Regression trees
  Model Application:
    For at least some embodiments, application of the estimation model includes:
    1. Picking two nodes between which the wireless link quality is to be estimated;
    2. Obtaining values of the predictor variables $x_1$, $x_2$, $x_3$, ..., $x_p$ for the chosen nodes;
    3. Load parameters of the estimator $c_1, c_2, c_3, ..., c_k$ as computed during model construction;
    4. Compute the estimated link quality $y_{est}=f(x_1, x_2, x_3, ..., x_p, c_1, c_2, c_3, ..., c_k;$
    5. Output the estimated link quality vest.
  The steps can be repeatedly executed;
    for the same pair of nodes, if the predictor variables change over time.
    for all pairs among a set of at least two nodes, in order to obtain a connectivity graph between the nodes.
  Although specific embodiments have been described and illustrated, the embodiments are not to be limited to the specific forms or arrangements of parts so described and illustrated.

What is claimed:

1. A motion-controlled device, comprising:
  a receiver to sense wireless communication signals of a plurality of separate wireless devices of a wireless network;
  a motion controller to control a positioning of the motion-controlled device in a plurality of dimensions;
  a controller to:
    at least facilitate analysis of the sensed wireless communication signals from the plurality of separate wireless devices; and
    provide a control signal to the motion controller, wherein the control signal controls the positioning of the motion-controlled device based at least in part on the analysis of the sensed wireless communication signals from the plurality of separate wireless devices; and wherein:
      the sensed wireless communication signals from the plurality of separate wireless devices of the wireless network comprise signals interfering with communication within the wireless network; and
      the positioning of the motion-controlled device reduces a sensed signal strength of a first wireless device below a specified threshold and maintains or increases a sensed signal strength of a second wireless device.

2. The motion-controlled device of claim 1, wherein the controller is further to support communication with an analytics engine.

3. The motion-controlled device of claim 2, wherein motion control of the motion-controlled device is at least partially controlled by the analytics engine.

4. The motion-controlled device of claim 2, wherein sensing of the wireless communication signals is at least partially controlled by the analytics engine.

5. The motion-controlled device of claim 1, wherein the controller to provide the control signal to the motion controller comprises the controller to:
  determine a received signal quality parameter at the receiver of a signal received from at least one terminal of the wireless network; and
  select the control signal to the motion controller to reposition the motion-controlled device to change the received signal quality parameter of the signal received from the at least one terminal of the wireless network.

6. The motion-controlled device of claim 5, wherein the control signal to the motion controller is selected to reposition the motion-controlled device to change the received signal quality parameter of the signal received from the at least one of terminals of the wireless network, while maintaining a received signal quality parameter of at least one signal received from other terminals of the wireless network relative to a specified threshold.

7. The motion-controlled device of claim 1, wherein motion control of the motion-controlled device is at least partially controlled by an operator.

8. The motion-controlled device of claim 1, wherein sensing of the wireless communication signals is at least partially controlled by an operator.

9. The motion-controlled device of claim 1, wherein sensing of the wireless communication signals is at least partially controlled by a software agent operating on the controller of the motion-controlled device.

10. The motion-controlled device of claim 1, wherein the sensed wireless communication signals comprise signals transmitted from a first external transceiver to a second external transceiver, wherein the analysis of the sensed wireless communication signals comprises diagnosing a problem condition associated with signals transmitted from the first external transceiver to the second external transceiver.

11. The motion-controlled device of claim 1, further comprising a sensor, wherein the sensor is separate from the receiver.

12. The motion-controlled device of claim 11, wherein the sensor comprises an image sensor, and wherein the controller is further to:
  facilitate analysis of a wireless device of the wireless network based on at least one image generated by the image sensor;
  determine from at least one image generated by the image sensor an approximation of a measureable quantity related to the wireless network;

determine, based on the approximation of the measureable quantity, whether to conduct a direct measurement of the measureable quantity related to the wireless network;
perform the direct measurement of the measureable quantity related to the wireless network; and
select the control signal to the motion controller to reposition the motion-controlled device to change the measureable quantity towards a pre-specified target value.

13. The motion-controlled device of claim 1, further comprising a positioning detection unit to determine one or more physical positioning coordinates of the motion-controlled device.

14. The motion-controlled device the motion-controlled device of claim 13, wherein the motion-controlled device is to measure a quantity of interest at each of multiple positionings.

15. The motion-controlled device of claim 14, wherein the controller is further to communicate the measured quantities of interest and corresponding positionings to an analytics engine.

16. The motion-controlled device of claim 15, wherein the analytic engine generates a map of the quantity of interest.

17. The motion-controlled device of claim 1, wherein the motion-controlled device is one of a plurality of motion-controlled devices, wherein each motion-controlled device of the plurality of motion-controlled devices is physically stored at a predetermined location, wherein each point in the wireless network can be navigated to by at least one of the plurality of motion-controlled devices within a predetermined time.

18. The motion-controlled device of claim 1, wherein the motion-controlled device is to follow a predefined measurement schedule when a problem of the wireless network is detected.

19. The motion-controlled device of claim 1, wherein the motion-controlled device is a relay station within the wireless network.

20. The motion-controlled device of claim 1, further comprising a pointing analysis device to detect a pointing direction of a directional apparatus (antenna) of a wireless device of the wireless network.

21. The motion-controlled device of claim 1, wherein the motion-controlled device is to communicate with a wireless device of the wireless network.

22. The motion-controlled device of claim 21, wherein the communication with the wireless device of the wireless network is through a secondary communication channel of the motion-controlled device.

23. The motion-controlled device of claim 22, wherein the communication with the wireless device of the wireless network comprises the motion-controlled device receiving internal state information of the wireless device.

24. The motion-controlled device of claim 1, wherein the controller and the motion controller are further to dock the motion-controlled device with a wireless device of the wireless network.

25. The motion-controlled device of claim 24, wherein at least some information is communicated between the motion-controlled device and the wireless device through a mechanical/electrical connection that is established while the motion-controlled device is docked with the wireless device.

26. The motion-controlled device of claim 1, wherein the motion-controlled device is to modify or update a wireless device of the wireless network and wherein to modify or update is selected from an upgrade of firmware, replacement of at least a portion of hardware, connection to a different access point, reorientation, and a reboot of the wireless device.

27. The motion-controlled device of claim 1, wherein the motion-controlled device is to determine desirable placements of to-be-deployed wireless devices of the wireless network.

28. The motion-controlled device of claim 1, wherein the motion-controlled device includes a directional antenna.

29. The motion-controlled device of claim 28, wherein the motion-controlled device is to indicate desirable placement of the to-be-deployed wireless device by physically marking the position.

30. The motion-controlled device of claim 28, further comprising controlling a positioning of the directional antenna.

31. The motion-controlled device of claim 1, wherein the motion-controlled device is one of a plurality of motion-controlled devices, and wherein positioning of at least one of the plurality of motion-controlled devices is coordinated by an analytics engine that is communicating with each of the plurality of motion-controlled devices.

32. A wireless network, comprising:
a plurality of separate wireless devices for communication through the wireless network;
one or more motion-controlled devices, wherein each motion-controlled device includes:
a receiver to sense wireless communication signals of the plurality of separate wireless devices of the wireless network;
a motion controller to control a positioning of the motion-controlled device in a plurality of dimensions;
a controller to:
at least facilitate analysis of the sensed wireless communication signals from the plurality of separate wireless devices; and
provide a control signal to the motion controller, wherein the control signal controls the positioning of the motion-controlled device based at least in part on analysis of the sensed wireless communication signals from the plurality of separate wireless devices; and wherein:
the sensed wireless communication signals from the plurality of separate wireless devices of the wireless network comprise signals interfering with communication within the wireless network; and
the positioning of the motion-controlled device reduces a sensed signal strength of a first wireless device below a specified threshold and maintains or increases a sensed signal strength of a second wireless device.

33. The wireless network of claim 32, further comprising an analytics engine, wherein the analytics engine detects events associated with the wireless network, and instructs the one or more motion-controlled devices to collect event-related information.

34. The wireless network of claim 33, wherein the control signal to the motion control is additionally based at least partially on the detected events.

35. A method of characterizing a wireless network, comprising:
sensing, by a receiver of a motion-controlled device, wireless communication signals of a plurality of separate wireless devices of a wireless network;

controlling, by a motion controller, a positioning of the motion-controlled device in a plurality of dimensions;
analyzing the sensed wireless communication signals from the plurality of separate wireless devices; and
providing a control signal to the motion controller, wherein the control signal controls the positioning of the motion-controlled device based at least in part on the analysis of the sensed wireless communication signals from the plurality of separate wireless devices; and wherein:
  the sensed wireless communication signals from the plurality of separate wireless devices of the wireless network comprise signals interfering with communication within the wireless network; and
  the positioning of the motion-controlled device reduces a sensed signal strength of a first wireless device below a specified threshold and maintains or increases a sensed signal strength of a second wireless device.

* * * * *